(12) United States Patent
Yin et al.

(10) Patent No.: US 11,741,572 B2
(45) Date of Patent: Aug. 29, 2023

(54) METHOD AND SYSTEM FOR DIRECTED TRANSFER OF CROSS-DOMAIN DATA BASED ON HIGH-RESOLUTION REMOTE SENSING IMAGES

(71) Applicant: Zhejiang University, Hangzhou (CN)

(72) Inventors: Jianwei Yin, Hangzhou (CN); Ge Su, Hangzhou (CN); Yongheng Shang, Hangzhou (CN); Zhengwei Shen, Hangzhou (CN)

(73) Assignee: Zhejiang University, Hangzhou (CN)

( * ) Notice: Subject to any disclaimer, the term of this patent is extended or adjusted under 35 U.S.C. 154(b) by 568 days.

(21) Appl. No.: 17/011,288

(22) Filed: Sep. 3, 2020

(65) Prior Publication Data

US 2022/0028038 A1 Jan. 27, 2022

(30) Foreign Application Priority Data

Jul. 22, 2020 (CN) .......................... 202010709169.X

(51) Int. Cl.
| | |
|---|---|
| *G06N 3/08* | (2023.01) |
| *G06T 3/00* | (2006.01) |
| *G06T 3/40* | (2006.01) |
| *G06F 18/214* | (2023.01) |
| *G06F 18/2415* | (2023.01) |

(52) U.S. Cl.
CPC ........ *G06T 3/4092* (2013.01); *G06F 18/2155* (2023.01); *G06F 18/2415* (2023.01); *G06N 3/08* (2013.01); *G06T 3/4053* (2013.01)

(58) Field of Classification Search
CPC . G06T 3/4092; G06T 3/4053; G06F 18/2155; G06F 18/2415; G06N 3/08
USPC ........................................................ 345/619
See application file for complete search history.

(56) References Cited

U.S. PATENT DOCUMENTS

| | | | |
|---|---|---|---|
| 2018/0341836 A1* | 11/2018 | Lim ..................... | G06F 18/2413 |
| 2019/0080233 A1* | 3/2019 | Procter ................. | G06N 3/045 |
| 2019/0122077 A1* | 4/2019 | Tsishkou .............. | G05D 1/0231 |
| 2020/0065673 A1* | 2/2020 | Huang ................... | G06N 3/047 |

* cited by examiner

*Primary Examiner* — Hai Tao Sun
(74) *Attorney, Agent, or Firm* — Dla Piper LLP (US)

(57) ABSTRACT

The present invention discloses a method and system for directed transfer of cross-domain data based on high-resolution remote sensing images. In the method of the present invention, first, an objective loss function which combines an image translation loss and a model adaptive loss of an image translation network model is established, thus overcoming the technical shortcoming that an existing data translation technique fails to take a specific task into full consideration and ignores a negative impact of data translation on the specific task. Further, a trained image translation network model is fine-tuned based on sample data, so that the image translation network model keeps translation towards the effect desired by the target model, thus avoiding over-interpretation or over-simplification during directed transfer of cross-domain data and improving accuracy of directed transfer of the cross-domain data based on the high-resolution remote sensing images.

6 Claims, 2 Drawing Sheets

METHOD AND SYSTEM FOR DIRECTED TRANSFER OF CROSS-DOMAIN DATA BASED ON HIGH-RESOLUTION REMOTE SENSING IMAGES

CROSS-REFERENCE TO RELATED APPLICATIONS

This application claims priority to Chinese Application Serial No. 202010709169.X, filed Jul. 22, 2020, the content of which is incorporated herein by reference in its entirety.

TECHNICAL FIELD

The present disclosure relates to the field of unsupervised image translation technologies, and in particular, to a method and system for directed transfer of cross-domain data based on high-resolution remote sensing images.

BACKGROUND

In recent years, semantic segmentation features increasingly prominently in artificial intelligence. For high-resolution remote sensing images, semantic segmentation has an increasingly wide range of applications, for example, road extraction in an automatic navigation system, building detection in the field of urban planning, oil tank detection during fault troubleshooting, and the like. At present, a large number of deep neural networks have been designed to complete a series of specific semantic segmentation tasks, and various comprehensive experiments have proved that these deep models have achieved superior performance. However, these models also inherit the limitation, that is, a poor generalization ability, of existing deep learning methods. Specifically, when samples to be detected and a training dataset vary in domain (that is, they are cross-domain data), the existing trained model is obviously reduced in detection performance.

In the high-resolution remote sensing field, generation of the cross-domain data is generally caused by different satellite configurations, for example, variations between satellites in track height, lens parameters, resolution, and the like. It is these differences that lead to a domain difference between remote sensing images captured by different satellites and a training set for an existing directed model, further resulting in poor detection performance of the directed model for data from different satellites. In addition, it should be noted that the currently obtainable cross-domain data is usually unlabeled, and it is costly and time-consuming to manually annotate the samples. Therefore, embodiments of the present disclosure can aim to solve the problem of a poor generalization ability of a directed model based on the high-resolution remote sensing images in an unlabeled case.

In view of the problem, previous attempts mainly employ an unsupervised image translation method. A generative adversarial network (GAN) can be used for unsupervised image translation, which uses a generator to mix up source-domain images and target-domain images to the maximum extent, and further uses a discriminator to distinguish whether an image is acquired from the generator or from true samples. The generator and the discriminator compete with each other to minimize the loss of the generator and further to maximize the ability of the discriminator to classify samples, finally promoting translation of the source-domain images into the target-domain images. In recent years, GAN networks such as dual GAN, CycleGAN, disco GAN, and pix2pix are proposed in succession in the field of computer vision, which implement unsupervised image-to-image translation in the absence of paired images. These techniques can achieve image translation between two domains. However, a data translation process fails to take a specific task into full consideration, ignoring a negative impact of data translation on the specific task. For example, in a road extraction task for a high-resolution remote sensing image, when source-domain data is relatively simple compared to target-domain data, some translated data may be "over-interpreted", resulting in the occurrence of textures or lines affecting road extraction. When the source-domain data is relatively complicated compared to the target-domain data, "oversimplified" data easily occurs, resulting in disappearance of some necessary textures and lines. Therefore, how to avoid over-interpretation or over-simplification during directed transfer of cross-domain data becomes a technical problem in urgent need to be solved.

SUMMARY

An objective of the present disclosure is to provide a method and system for directed transfer of cross-domain data based on high-resolution remote sensing images, so as to avoid over-interpretation or over-simplification during directed transfer of the cross-domain data.

To achieve the above purpose, embodiments of the present disclosure can provide the following technical solutions.

According to one aspect of the present disclosure, a method of cross-domain data based on high-resolution remote sensing images can include acquiring labeled source-domain images and unlabeled target-domain images, to establish a training data sample set, wherein training data samples comprise source-domain images, true labels of the source-domain images, and target-domain images; and the source-domain images, the true labels of the source-domain images, and the target-domain images are respectively formed in a source-domain image set, a source-domain image label set, and a target-domain image set; establishing an image translation network model for directed transfer of cross-domain data of high-resolution remote sensing images; establishing an objective loss function which combines an image translation loss and a model adaptive loss of the image translation network model; training the image translation network model by using the training data sample set, to obtain a trained image translation network model; inputting the labeled source-domain images into the trained image translation network model to translate the labeled source-domain images into target-domain transferred images; by using labels of the labeled source-domain images as labels of the transferred images, establishing a data sample set for fine tuning; and classifying the data sample set for fine tuning into a training set and a test set; fine-tuning the semantic segmentation model of the trained image translation network model by using the training set such that the model adaptive loss is less than a threshold of the model adaptive loss, to obtain a fine-tuned image translation network model; inputting the test set into the fine-tuned image translation network model, and calculating a value of the objective loss function of the fine-tuned image translation network model; determining whether the value of the objective loss function is less than a threshold of the objective loss function, to obtain a first determining result; if the first determining result is no, returning to the step of "training the image translation network model by using the training data sample set, to obtain a trained image translation network model", to train and fine-tune the fine-tuned image translation network model once again; if the first determining result is yes, outputting the fine-tuned image translation network model as the trained image translation network model; and inputting the high-resolution remote sensing images to be processed in the source domain into the trained image translation network model, to obtain target-domain translated images; and transferring the target-domain translated images in a directed manner.

In some embodiments, the image translation network model can include two generators, two discriminators, and a semantic segmentation model; the two generators are a forward generator and a backward generator; and the two discriminators are a target domain discriminator and a source domain discriminator. The generator can be formed by successively connecting one reflection padding layer, three convolutional layers, five residual blocks, and three convolutional layers; and the discriminator can be formed by successively connecting a first convolutional layer module, a second convolutional layer module, and a third convolutional layer module.

In some embodiments, the step of establishing an objective loss function which combines an image translation loss and a model adaptive loss of the image translation network model can include establishing adversarial loss functions $L_{GAN}(G,D_Y,X,Y)$ and $L_{GAN}(F,D_X,X,Y)$ respectively corresponding to forward mapping and backward mapping of the image translation network model:

$$L_{GAN}(G,D_Y,X,Y)=E_{y\sim p_{data}(y)}[\log D_Y(y)]+E_{x\sim p_{data}(x)}[\log(1-D_Y(G(x)))]$$

$$L_{GAN}(F,D_X,X,Y)=E_{x\sim p_{data}(x)}[\log D_X(x)]+E_{y\sim p_{data}(y)}[\log(1-D_X(F(y)))]$$

where G denotes the forward mapping, F denotes the backward mapping, $D_Y$ denotes the target domain discriminator, $D_X$ denotes the source domain discriminator, X denotes the source domain, and Y denotes the target domain; $y\sim p_{data(y)}$ denotes target-domain images conforming to a probability distribution $p_{data(y)}$ of the target domain, $E_{y\sim p_{data}(y)}$ denotes expectations of the target-domain images conforming to the probability distribution $p_{data(y)}$ of the target domain, $x\sim p_{data(x)}$ denotes source-domain images conforming to a probability distribution $p_{data(x)}$ of the source domain, and $E_{x\sim p_{data}(x)}$ denotes expectations of the source-domain images conforming to the probability distribution $p_{data(x)}$ of the source domain; $D_Y(y)$ denotes a judgment whether true target-domain data y belongs to the target domain, $D_X(x)$ denotes a judgment whether true source-domain data x belongs to the source domain, and G(x) denotes images which are generated after the source-domain images are subjected to forward mapping with the forward generator and conform to the probability distribution of the target domain; and $D_Y(G(x))$ denotes a judgment whether the generated images G(x) corresponding to the source-domain images belong to the target domain, F(y) denotes images which are generated after the target-domain images are subjected to backward mapping with the backward generator and conform to the probability distribution of the source domain, and $D_X(F(y))$ denotes a judgment whether the generated images F(y) corresponding to the target-domain images belong to the source domain.

establishing a cycle consistency loss function $L_{cyc}(G,F)$ of the image translation network model:

$$L_{cyc}(G,F)=E_{x\sim p_{data}(x)}[\|F(G(x))-x\|_1]+E_{y\sim p_{data}(y)}[\|G(F(y))-y\|_1]$$

where F(G(x)) denotes reconstructed images corresponding to the source-domain images and generated after the source-domain images x are subjected to the forward mapping G and the backward mapping F sequentially, and G(F(y)) denotes reconstructed images corresponding to the target-domain images and generated after the target-domain images y are subjected to the backward mapping F and the forward mapping G sequentially;

establishing a model adaptive loss function $L_M(S,M(g(Te)))$ of the image translation network model:

$$L_M(S,M(g(Te)))=\left\|1-\frac{\sum_{i=1}^{K}IoU(S_i,M(G(x_i)))}{K}\right\|$$

$$S_i\in S, x_i\in Te, 0\le i\le K$$

where S denotes a label set of the source-domain images, $s_i$ denotes a true label corresponding to the ith source-domain image in the source-domain image set, Te denotes the source-domain image set, $x_i$ denotes the ith source-domain image in the source-domain image set, and K denotes the number of the source-domain images in the source-domain image set; $M(\cdot)$ denotes a semantic segmentation model, $IoU(\cdot)$ denotes an Intersection over Union (IoU) calculation function, and $M(G(x_i))$ denotes a predicted label obtained after a generated image $G(x_i)$ corresponding to the ith source-domain image is predicted by using the semantic segmentation model $M(\cdot)$; M(g(Te)) denotes a predicted label set for the source-domain image set, that is obtained after generated images corresponding to all the source-domain images in the source-domain image set are predicted by using the semantic segmentation model $M(\cdot)$; and $IoU(s_i,M(G(x_i)))$ denotes an IoU index between a true label and a predicted label that are corresponding to the ith source-domain image; and establishing the objective loss function $L(G,F,D_X,D_Y,M)$ which combines the image translation loss and the model adaptive loss of the image translation network model:

$$L(G,F,D_X,D_Y,M)=L_{GAN}(G,D_Y,X,Y)+L_{GAN}(F,D_X,X,Y)+\lambda L_{cyc}(G,F)+\varphi L_M(S,M(g(Te)))$$

where $\lambda$ denotes a first hyper-parameter and $\varphi$ denotes a second hyper-parameter.

Optionally, the step of training the image translation network model by using the training data sample set, to obtain a trained image translation network model specifically includes:

acquiring a preset number of training data samples from the training data sample set, and grouping the samples into a training data sample subset;

inputting the ith training data sample in the training data sample subset into the image translation network model, and calculating a numerical value of the objective loss function of the image translation network model;

feeding back the numerical value of the objective loss function to the forward generator and the backward generator of the image translation network model, to update parameters of the forward generator and the backward generator;

determining whether a numerical value of i is less than the preset number, to obtain a second determining result;

if the second determining result is yes, adding 1 to the numerical value of i, and returning to the step of "inputting the ith training data sample in the training data sample subset into the image translation network model, and calculating a numerical value of the objective loss function of the image translation network model";

if the second determining result is no, letting the numerical value of i equal 1;

inputting a source-domain image of the ith training data sample in the training data sample subset into the forward generator of the image translation network model, and carrying out forward mapping, to obtain a generated image corresponding to the source-domain image; inputting the generated image corresponding to the source-domain image into the backward generator of the image translation network model, and carrying out backward mapping, to obtain a reconstructed image corresponding to the source-domain image; inputting a target-domain image of the ith training data sample in the training data sample subset into the backward generator of the image translation network model, and carrying out backward mapping, to obtain a generated image corresponding to the target-domain image; and inputting the generated image corresponding to the target-domain image into the forward generator of the image translation network model, and carrying out forward mapping, to obtain a reconstructed image corresponding to the target-domain image;

updating a weight of the source domain discriminator according to losses in determining, by the source domain discriminator, whether the generated image corresponding to the target-domain image belongs to the source domain and whether the source-domain image belongs to the source domain;

updating a weight of the target domain discriminator according to losses in determining, by the target domain discriminator, whether the generated image corresponding to the source-domain image belongs to the target domain and whether the target-domain image belongs to the target domain;

determining whether the numerical value of i is less than the preset number, to obtain a third determining result;

if the third determining result is yes, adding 1 to the numerical value of i, and returning to the step of "inputting a source-domain image of the ith training data sample in the training data sample subset into the forward generator of the image translation network model, and carrying out forward mapping, to obtain a generated image corresponding to the source-domain image; inputting the generated image corresponding to the source-domain image into the backward generator of the image translation network model, and carrying out backward mapping, to obtain a reconstructed image corresponding to the source-domain image; inputting a target-domain image of the ith training data sample in the training data sample subset into the backward generator of the image translation network model, and carrying out backward mapping, to obtain a generated image corresponding to the target-domain image; and inputting the generated image corresponding to the target-domain image into the forward generator of the image translation network model, and carrying out forward mapping, to obtain a reconstructed image corresponding to the target-domain image";

if the third determining result is no, determining whether the number of iterations reaches a threshold of the number of iterations, to obtain a fourth determining result; and if the fourth determining result is no, adding 1 to the number of iterations, and returning to the step of "acquiring a preset number of training data samples from the training data sample set, and grouping the samples into a training data sample subset"; or if the fourth determining result is yes, outputting an updated image translation network model as the trained image translation network model.

Optionally, the step of inputting the ith training data sample in the training data sample subset into the image translation network model, and calculating a numerical value of the objective loss function of the image translation network model specifically includes:

inputting the source-domain image of the ith training data sample in the training data sample subset into the forward generator of the image translation network model, and carrying out forward mapping, to obtain the generated image corresponding to the source-domain image; inputting the generated image corresponding to the source-domain image into the backward generator of the image translation network model, and carrying out backward mapping, to obtain the reconstructed image corresponding to the source-domain image; inputting the target-domain image of the ith training data sample in the training data sample subset into the backward generator of the image translation network model, and carrying out backward mapping, to obtain the generated image corresponding to the target-domain image; and inputting the generated image corresponding to the target-domain image into the forward generator of the image translation network model, and carrying out forward mapping, to obtain the reconstructed image corresponding to the target-domain image;

according to results of determining, by the source domain discriminator, whether the source-domain image belongs to the source domain and whether the generated image for the target domain belongs to the source domain, calculating a value of an adversarial loss function for the backward mapping by using a formula: $L_{GAN}(F,D_X,X,Y)=E_{x \sim p_{data}(x)}[\log D_X(x)]+E_{y \sim p_{data}(y)}[\log(1-D_X(F(y)))]$;

according to results of determining, by the target domain discriminator, whether the target-domain image belongs to the target domain and whether the generated image for the source domain belongs to the target domain, calculating a value of an adversarial loss function for the forward mapping by using a formula: $L_{GAN}(G,D_Y,X,Y)=E_{y \sim p_{data}(y)}[\log D_Y(y)]+E_{x \sim p_{data}(x)}[\log(1-D_Y(G(x)))]$;

according to a difference value between the source-domain image and the reconstructed image corresponding to the source-domain image and a difference value between the target-domain image and the reconstructed image corresponding to the target-domain image, calculating a value of the cycle consistency loss function by using a formula: $L_{cyc}(G,F)=E_{x \sim p_{data}(x)}[\|F(G(x))-x\|_1]+E_{y \sim p_{data}(y)}[\|G(F(y))-y\|_1]$;

calculating a value of a model adaptive loss function of the image translation network model by using a formula:

$$L_M(S, M(g(Te))) = \left\| 1 - \frac{\sum_{i=1}^{K} IoU(S_i, M(G(x_i)))}{K} \right\|$$

$$S_i \in S, x_i \in Te, 0 \le i \le K;$$

and according to the value of the adversarial loss function for the backward mapping, the value of the adversarial loss function for the forward mapping, the value of the cycle consistency loss function, and the value of the model adaptive loss function, calculating the numerical value of the objective loss function of the image translation network model by using a formula:

$$L(G,F,D_X,D_Y,M)=L_{GAN}(G,D_Y,X,Y)+L_{GAN}(F,D_X,X,Y)+ \lambda L_{cyc}(G,F)+\varphi L_M(S,M(g(Te))).$$

A system for directed transfer of cross-domain data based on high-resolution remote sensing images includes:

a module for establishing a training data sample set, configured to acquire labeled source-domain images and unlabeled target-domain images, to establish a training data sample set, where training data samples include source-domain images, true labels of the source-domain images, and target-domain images; and the source-domain images, the true labels of the source-domain images, and the target-domain images are respectively formed in a source-domain image set, a source-domain image label set, and a target-domain image set;

a module for establishing an image translation network model, configured to establish an image translation network model for directed transfer of cross-domain data of high-resolution remote sensing images;

an objective loss function establishing module, configured to establish an objective loss function which combines an image translation loss and a model adaptive loss of the image translation network model;

a training module, configured to train the image translation network model by using the training data sample set, to obtain a trained image translation network model;

a module for establishing a data sample set, configured to input the labeled source-domain images into the trained image translation network model to translate the labeled source-domain images into target-domain transferred images; by using labels of the labeled source-domain images as labels of the transferred images, establish a data sample set for fine tuning; and classify the data sample set for fine tuning into a training set and a test set;

a fine tuning module, configured to fine-tune the semantic segmentation model of the trained image translation network model by using the training set such that the model adaptive loss is less than a threshold of the model adaptive loss, to obtain a fine-tuned image translation network model;

an objective loss function calculation module, configured to input the test set into the fine-tuned image translation network model, and calculate a value of the objective loss function of the fine-tuned image translation network model;

a first determining module, configured to determine whether the value of the objective loss function is less than a threshold of the objective loss function, to obtain a first determining result;

a returning module, configured to: if the first determining result is no, return to the step of "training the image translation network model by using the training data sample set, to obtain a trained image translation network model", to train and fine-tune the fine-tuned image translation network model once again;

a model output module, configured to: if the first determining result is yes, output the fine-tuned image translation network model as the trained image translation network model; and a directed transfer module, configured to input the high-resolution remote sensing images to be processed in the source domain into the trained image translation network model, to obtain target-domain translated images; and transfer the target-domain translated images in a directed manner.

Optionally, the image translation network model includes two generators, two discriminators, and a semantic segmentation model; the two generators are a forward generator and a backward generator; and the two discriminators are a target domain discriminator and a source domain discriminator;

the generator is formed by successively connecting one reflection padding layer, three convolutional layers, five residual blocks, and three convolutional layers; and the discriminator is formed by successively connecting a first convolutional layer module, a second convolutional layer module, and a third convolutional layer module.

Optionally, the objective loss function establishing module specifically includes:

an adversarial loss function establishing submodule, configured to establish adversarial loss functions $L_{GAN}(G,D_Y,X,Y)$ and $L_{GAN}(F,D_X,X,Y)$ respectively corresponding to forward mapping and backward mapping of the image translation network model:

$$L_{GAN}(G,D_Y,X,Y)=E_{y \sim p_{data}(y)}[\log D_Y(y)]+E_{x \sim p_{data}(x)}[\log (1-D_Y(G(x)))]$$

$$L_{GAN}(F,D_X,X,Y)=E_{x \sim p_{data}(x)}[\log D_X(x)]+E_{y \sim p_{data}(y)}[\log (1-D_X(F(y)))]$$

where G denotes the forward mapping, F denotes the backward mapping, $D_Y$ denotes the target domain discriminator, $D_X$ denotes the source domain discriminator, X denotes the source domain, and Y denotes the target domain; $y \sim p_{data(y)}$ denotes target-domain images conforming to a probability distribution $p_{data(y)}$ of the target domain, $E_{y \sim p_{data}(y)}$ denotes expectations of the target-domain images conforming to the probability distribution $p_{data(y)}$ of the target domain, $x \sim p_{data(x)}$ denotes source-domain images conforming to a probability distribution $p_{data(x)}$ of the source domain, and $E_{x \sim p_{data}(x)}$ denotes expectations of the source-domain images conforming the probability distribution $p_{data(x)}$ of the source domain; $D_Y(y)$ denotes a judgment whether true target-domain data y belongs to the target domain, $D_X(x)$ denotes a judgment whether true source-domain data x belongs to the source domain, and $G(x)$ denotes images which are generated after the source-domain images are subjected to forward mapping with the forward generator and conform to the probability distribution of the target domain; and $D_Y(G(x))$ denotes a judgment whether the generated images $G(x)$ corresponding to the source-domain images belong to the target domain, $F(y)$ denotes images which are generated after the target-domain images are subjected to backward mapping with the backward generator and conform to the probability distribution of the source domain, and $D_X(F(y))$ denotes a judgment whether the generated images $F(y)$ corresponding to the target-domain images belong to the source domain.

a cycle consistency loss function establishing submodule, configured to establish a cycle consistency loss function $L_{cyc}(G,F)$ of the image translation network model:

$$L_{cyc}(G,F)=E_{x \sim p_{data}(x)}[\|F(G(x))-x\|_1]+E_{y \sim p_{data}(y)}[\|G(F(y))-y\|_1]$$

where $F(G(x))$ denotes reconstructed images corresponding to the source-domain images and generated after the source-domain images x are subjected to the forward mapping G and the backward mapping F sequentially, and $G(F(y))$ denotes reconstructed images corresponding to the target-domain images and generated after the target-domain images y are subjected to the backward mapping F and the forward mapping G sequentially;

an adaptive loss function establishing submodule, configured to establish a model adaptive loss function of the image translation network model:

$$L_M(S, M(g(Te))) = \left\| 1 - \frac{\sum_{i=1}^{K} IoU(S_i, M(G(x_i)))}{K} \right\|$$

$$S_i \in S, x_i \in Te, 0 \leq i \leq K$$

where S denotes a label set of the source-domain images, $s_i$ denotes a true label corresponding to the ith source-domain image in the source-domain image set, Te denotes the source-domain image set, $x_i$ denotes the ith source-domain image in the source-domain image set, and K denotes the number of the source-domain images in the source-domain image set; M(·) denotes a semantic segmentation model, IoU(·) denotes an Intersection over Union (IoU) calculation function, and $M(G(x_i))$ denotes a predicted label obtained after a generated image $G(x_i)$ corresponding to the ith source-domain image is predicted by using the semantic segmentation model M(·); M(g(Te)) denotes a predicted label set for the source-domain image set, that is obtained after generated images corresponding to all the source-domain images in the source-domain image set are predicted by using the semantic segmentation model M(·); and $IoU(s_i, M(G(x_i)))$ denotes an IoU index between a true label and a predicted label that are corresponding to the ith source-domain image; and an objective loss function establishing submodule, configured to establish the objective loss function $L(G, F, D_X, D_Y, M)$ which combines the image translation loss and the model adaptive loss of the image translation network model:

$$L(G,F,D_X,D_Y,M) = L_{GAN}(G,D_Y,X,Y) + L_{GAN}(F,D_X,X,Y) + \lambda L_{cyc}(G,F) + \varphi L_M(S, M(g(Te)))$$

where $\lambda$ denotes a first hyper-parameter and $\varphi$ denotes a second hyper-parameter.

Optionally, the training module specifically includes:

a selection submodule for forming a training data sample subset, configured to acquire a preset number of training data samples from the training data sample set, and group the samples into a training data sample subset;

an objective loss function calculation submodule, configured to input the ith training data sample in the training data sample subset into the image translation network model, and calculate a numerical value of the objective loss function of the image translation network model;

a submodule for updating parameters of a forward generator and a backward generator, configured to feed back the numerical value of the objective loss function to the forward generator and the backward generator of the image translation network model, to update parameters of the forward generator and the backward generator;

a second determining submodule, configured to determine whether a numerical value of i is less than the preset number, to obtain a second determining result;

a first returning submodule, configured to: if the second determining result is yes, add 1 to the numerical value of i, and return to the step of "inputting the ith training data sample in the training data sample subset into the image translation network model, and calculating a numerical value of the objective loss function of the image translation network model";

a value initialization submodule, configured to: if the second determining result is no, let the numerical value of i equal 1;

an image reconstruction submodule, configured to input a source-domain image of the ith training data sample in the training data sample subset into the forward generator of the image translation network model, and carry out forward mapping, to obtain a generated image corresponding to the source-domain image; input the generated image corresponding to the source-domain image into the backward generator of the image translation network model, and carry out backward mapping, to obtain a reconstructed image corresponding to the source-domain image; input a target-domain image of the ith training data sample in the training data sample subset into the backward generator of the image translation network model, and carry out backward mapping, to obtain a generated image corresponding to the target-domain image; and input the generated image corresponding to the target-domain image into the forward generator of the image translation network model, and carry out forward mapping, to obtain a reconstructed image corresponding to the target-domain image;

a submodule for updating a weight of the source domain discriminator, configured to update a weight of the source domain discriminator according to losses in determining, by the source domain discriminator, whether the generated image corresponding to the target-domain image belongs to the source domain and whether the source-domain image belongs to the source domain;

a submodule for updating a weight of the target domain discriminator, configured to update a weight of the target domain discriminator according to losses in determining, by the target domain discriminator, whether the generated image corresponding to the source-domain image belongs to the target domain and whether the target-domain image belongs to the target domain;

a third determining submodule, configured to determine whether the numerical value of i is less than the preset number, to obtain a third determining result;

a second returning submodule, configured to: if the third determining result is yes, add 1 to the numerical value of i, and return to the step of "inputting a source-domain image of the ith training data sample in the training data sample subset into the forward generator of the image translation network model, and carrying out forward mapping, to obtain a generated image corresponding to the source-domain image; inputting the generated image corresponding to the source-domain image into the backward generator of the image translation network model, and carrying out backward mapping, to obtain a reconstructed image corresponding to the source-domain image; inputting a target-domain image of the ith training data sample in the training data sample subset into the backward generator of the image translation network model, and carrying out backward mapping, to obtain a generated image corresponding to the target-domain image; and inputting the generated image corresponding to the target-domain image into the forward generator of the image translation network model, and carrying out forward mapping, to obtain a reconstructed image corresponding to the target-domain image";

a fourth determining submodule, configured to: if the third determining result is no, determine whether the number of iterations reaches a threshold of the number of iterations, to obtain a fourth determining result;

a third returning submodule, configured to: if the fourth determining result is no, add 1 to the number of iterations, and return to the step of "acquiring a preset number of training data samples from the training data sample set, and grouping the samples into a training data sample subset"; and a result output submodule, configured to: if the fourth determining result is yes, output an updated image translation network model as the trained image translation network model.

Optionally, the objective loss function calculation submodule specifically includes:

an image reconstruction unit, configured to input the source-domain image of the ith training data sample in the training data sample subset into the forward generator of the image translation network model, and carry out forward mapping, to obtain the generated image corresponding to the source-domain image; input the generated image corresponding to the source-domain image into the backward generator of the image translation network model, and carry out backward mapping, to obtain the reconstructed image corresponding to the source-domain image; input the target-domain image of the ith training data sample in the training data sample subset into the backward generator of the image translation network model, and carry out backward mapping, to obtain the generated image corresponding to the target-domain image; and input the generated image corresponding to the target-domain image into the forward generator of the image translation network model, and carry out forward mapping, to obtain the reconstructed image corresponding to the target-domain image;

a unit for calculating the adversarial loss function for the backward mapping, configured to: according to results of determining, by the source domain discriminator, whether the source-domain image belongs to the source domain and whether the generated image for the target domain belongs to the source domain, calculate a value of the adversarial loss function for the backward mapping by using a formula: $L_{GAN}(F,D_X,X,Y)=E_{x\sim p_{data}(x)}[\log D_X(x)]+E_{y\sim p_{data}(y)}[\log(1-D_X(F(y)))]$;

a unit for calculating the adversarial loss function for the forward mapping, configured to: according to results of determining, by the target domain discriminator, whether the target-domain image belongs to the target domain and whether the generated image for the source domain belongs to the target domain, calculate a value of the adversarial loss function for the forward mapping by using a formula: $L_{GAN}(G,D_Y,X,Y)=E_{y\sim p_{data}(y)}[\log D_Y(y)]+E_{x\sim p_{data}(x)}[\log(1-D_Y(G(x)))]$;

a unit for calculating the cycle consistency loss function, configured to: according to a difference value between the source-domain image and the reconstructed image corresponding to the source-domain image and a difference value between the target-domain image and the reconstructed image corresponding to the target-domain image, calculate a value of the cycle consistency loss function by using a formula: $L_{cyc}(G,F)=E_{x\sim p_{data}(x)}[\|F(G(x))-x\|_1]+E_{y\sim p_{data}(y)}[\|G(F(y))-y\|_1]$; and calculating a value of the model adaptive loss function of the image translation network model by using a formula:

$$L_M(S, M(g(Te))) = \left\| 1 - \frac{\sum_{i=1}^{K} IoU(S_i, M(G(x_i)))}{K} \right\|$$

$S_i \in S, x_i \in Te, 0 \le i \le K$;

and an objective loss function calculation unit, configured to: according to the value of the adversarial loss function for the backward mapping, the value of the adversarial loss function for the forward mapping, the value of the cycle consistency loss function, and the value of the model adaptive loss function, calculate the numerical value of the objective loss function of the image translation network model by using a formula: $L(G,F,D_X,D_Y,M)=L_{GAN}(G D_Y,X,Y)+L_{GAN}(F,D_X,X,Y)+\lambda L_{cyc}(G,F)+\varphi L_M(S,M(g(Te)))$.

According to some embodiments provided by the present disclosure, the following technical effects may be realized.

Embodiments of the present disclosure can include a method and system for directed transfer of cross-domain data based on high-resolution remote sensing images. In the method of the present disclosure, first, an objective loss function which combines an image translation loss and a model adaptive loss of an image translation network model is established, thus overcoming the technical shortcoming that an existing data translation technique fails to take a specific task into full consideration and ignores a negative impact of data translation on the specific task. Further, a trained image translation network model is fine-tuned based on sample data, so that the image translation network model keeps translation towards the effect desired by the target model, thus avoiding over-interpretation or over-simplification during directed transfer of cross-domain data and improving accuracy of directed transfer of the cross-domain data based on the high-resolution remote sensing images.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and those of ordinary skill in the art may still derive other drawings from these accompanying drawings without creative efforts.

DETAILED DESCRIPTION

An objective of the present disclosure is to provide a method and system for directed transfer of cross-domain data based on high-resolution remote sensing images, so as to avoid over-interpretation or over-simplification during directed transfer of the cross-domain data.

To make the foregoing objective, features, and advantages of the present invention clearer and more comprehensible, the present invention is further described in detail below with reference to the accompanying drawings and specific examples.

To achieve the above objective, embodiments of the present disclosure can provide one or more of the following solutions:

Some known unsupervised image translation methods can take training data as source-domain data and cross-domain data as target-domain data. Although this method realizes image translation between two domains, it fails to consider adaptability of a translated image to a specific model, which can result in over-interpretation or over-simplification of the translated image. Embodiments of the present disclosure can employ a mature image translation framework (for example, a cycleGAN network) and construct an objective function to be optimized to make the distribution of the source-domain data similar to that of the target-domain data by translation. Afterwards, a task model can be fine-tuned by using the translated data and labels of the source-domain data so that the interior parameters of the current task model can be applicable in the distribution of the target-domain data. Finally, embodiments of the present disclosure can evaluate the performance of the fine-tuned model and feed back its performance evaluation to an image translation network to adjust parameters of the model. The foregoing steps can be repeated until a loss in a current task falls within an acceptable range.

Figure 1:
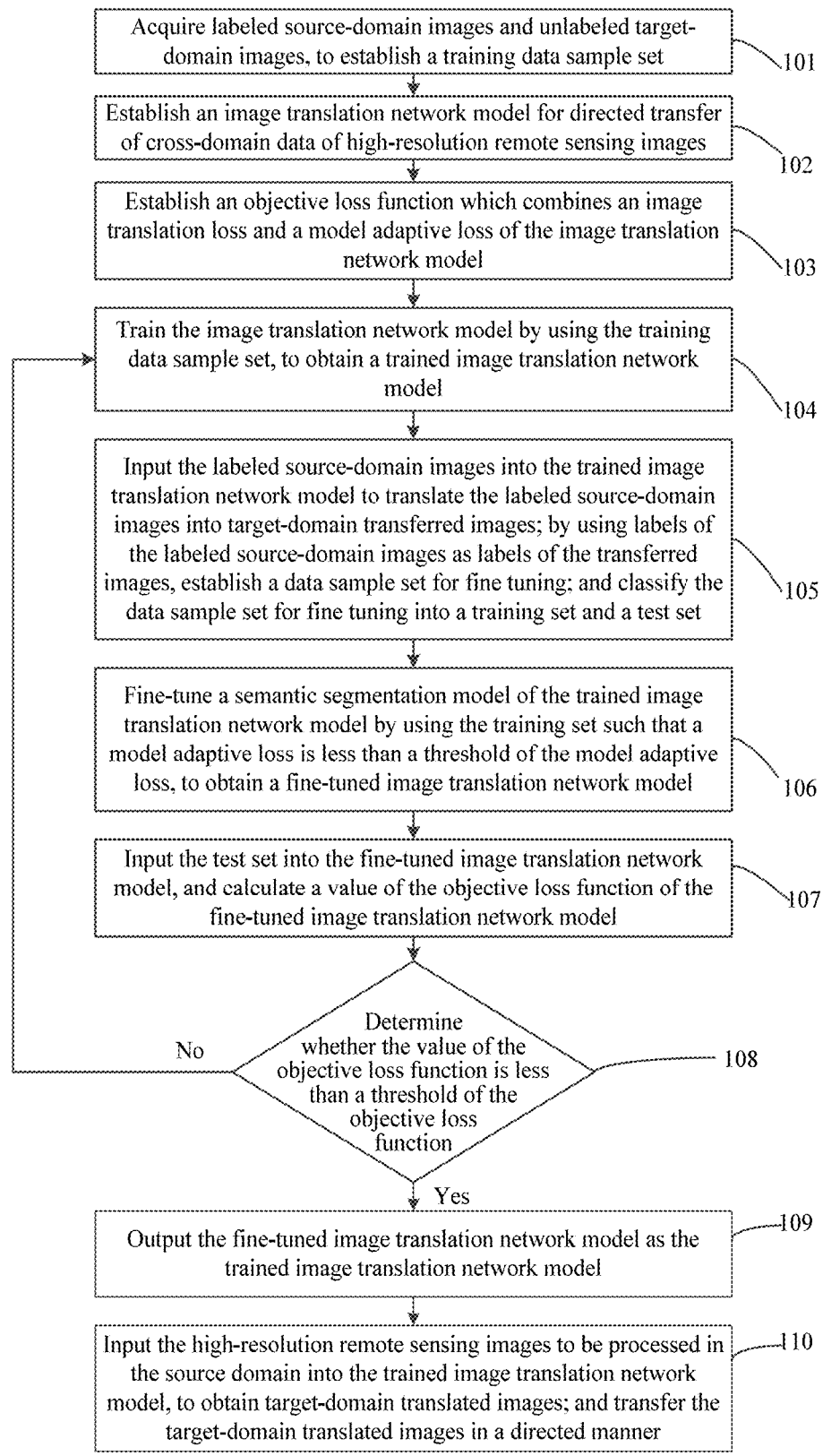
FIG. 1 is a flowchart of a method for directed transfer of cross-domain data based on high-resolution remote sensing images, according to some embodiments of the present disclosure.
Figure 2:
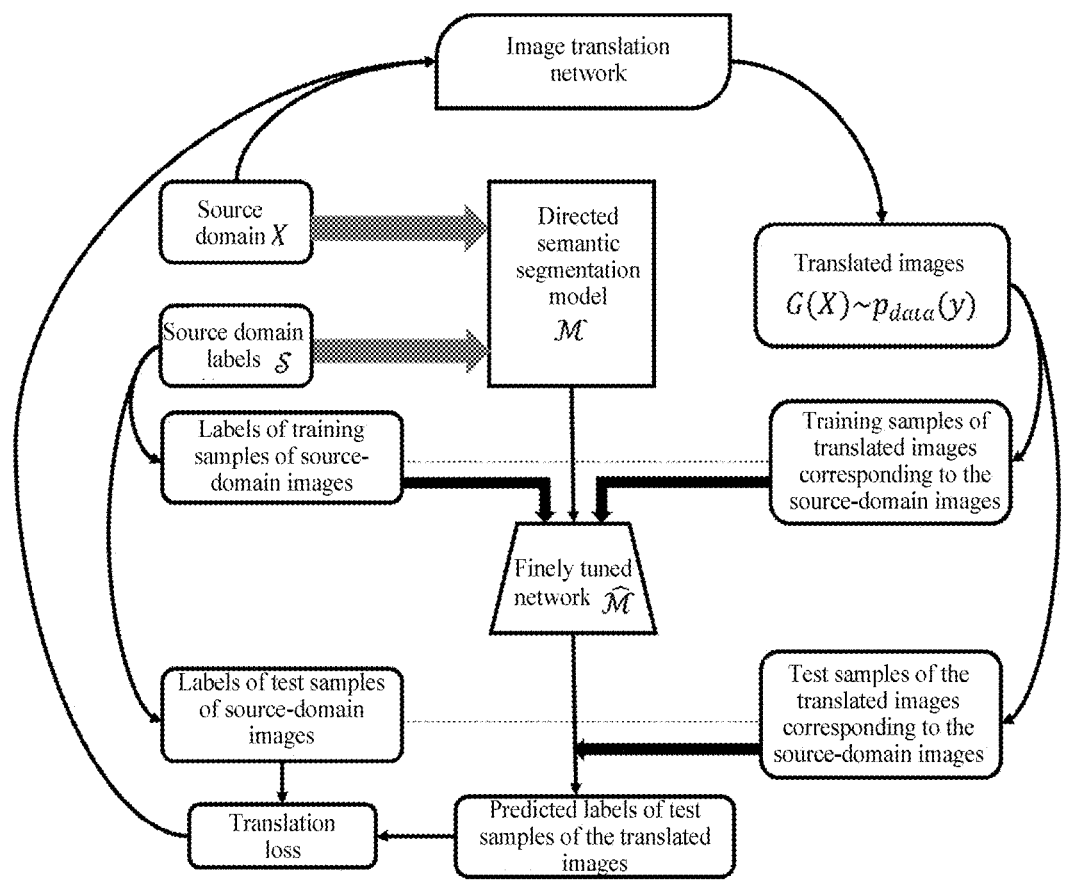
FIG. 2 is a principle diagram of the method for directed transfer of cross-domain data based on high-resolution remote sensing images, according to some embodiments of the present disclosure.

FIG. 1 is a flowchart of a method for directed transfer of cross-domain data based on high-resolution remote sensing image, according to some embodiments of the present disclosure. FIG. 2 is a principle diagram of the method for directed transfer of cross-domain data based on high-resolution remote sensing images, according to some embodiments of the present disclosure. In FIG. 2, X denotes a source domain; S denotes source domain labels; M(·) denotes a directed semantic segmentation model, $\hat{M}$ is a fine-tuned network; $G(X) \sim p_{data}(y)$ denotes images obtained after translation of source-domain images by forward mapping, which conform to a probability distribution $p_{data(y)}$ of a target domain.

Figure 3:
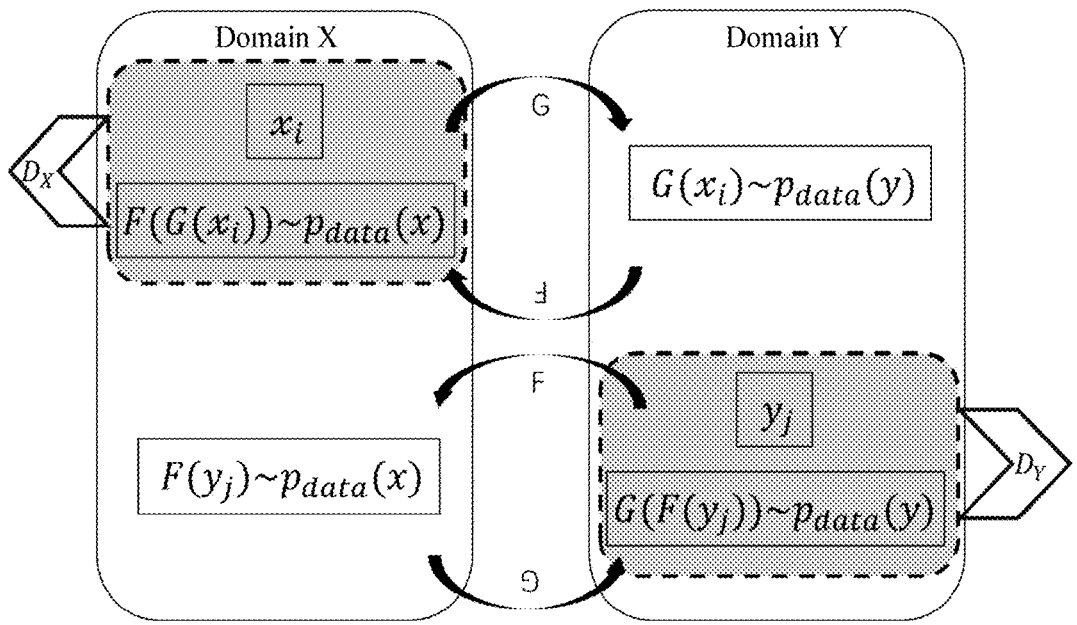
FIG. 3 is a schematic principle diagram of image translation by using an image translation network model, according to some embodiments of the present disclosure.

FIG. 3 is a schematic diagram of an image translation network, according to some embodiments of the present disclosure. In FIG. 3, X denotes a source domain; Y denotes a target domain; G is forward mapping from the source domain to the target domain; F is backward mapping from the target domain to the source domain, $D_X$ denotes a classifier for distinguishing a source-domain true sample from an image reconstructed for the target domain; $D_Y$ denotes a classifier for distinguishing a target-domain true sample from an image reconstructed for the source domain; $x_i$ denotes a particular source-domain image; $G(x_i) \sim p_{data}(y)$ denotes image $G(x_i)$ obtained after translation of the source-domain image $x_i$ by forward mapping, which conforms to a probability distribution $p_{data(y)}$ of the target domain; $F(y_i) \sim p_{data}(x)$ is an image $F(y_i)$ obtained after translation of the target-domain image $y_i$ by backward mapping, which conforms to a probability distribution $p_{data(x)}$ of the source domain; $F(G(x_i)) \sim p_{data}(x)$ denotes an image $F(G(x_i))$ obtained after translation of the image G ($x_i$) by backward mapping, which conforms to the probability distribution $p_{data(x)}$ of the source domain; and $G(F(y_i)) \sim p_{data}(y)$ denotes an image $G(F(y_i))$ obtained after translation of the image $F(y_i)$ by forward mapping, which conforms to the probability distribution 11 data(y) of the target domain.

As shown in FIGS. 1 and 2, a method for directed transfer of cross-domain data based on high-resolution remote sensing images is provided, where the directed transfer method includes the following steps.

At step 101, acquire labeled source-domain images and unlabeled target-domain images to establish a training data sample set, where training data samples can include source-domain images, true labels of the source-domain images, and target-domain images. In some embodiments, the source-domain images, the true labels of the source-domain images, and the target-domain images are respectively formed in a source-domain image set, a source-domain image label set, and a target-domain image set.

At step 102, establish an image translation network model for directed transfer of cross-domain data of high-resolution remote sensing images.

Specifically, embodiments of the present disclosure can use, but is not limited to, a CycleGAN network. The following description is made by using the CycleGAN network as an example.

The CycleGAN network is mainly composed of a generator and a discriminator. Specifically, the image translation network model includes two generators, two discriminators, and a semantic segmentation model. The two generators are a forward generator and a backward generator; and the two discriminators are a target domain discriminator and a source domain discriminator.

Herein, an image translation network used in a style transfer task is selected as the generator, and PatchGAN is selected as the discriminator. A generator can be a network structure formed by successively connecting one reflection padding layer, three convolutional layers, five residual blocks, and three convolutional layers, which is specifically as follows: an input image->a reflection padding layer->a convolutional layer 1 (with a convolution kernel size of 32×9×9 and a stride of 1)->a convolutional layer 2 (with a convolution kernel size of 64×3×3 and a stride of 2)->a convolutional layer 3 (with a convolution kernel size of 128×3×3 and a stride of 2)->a residual block (with a kernel size of 128)->a residual block (with a kernel size of 128)->a residual block (with a kernel size of 128)->a residual block (with a kernel size of 128)->a residual block (with a kernel size of 128)->a convolutional layer 4 (with a convolution kernel size of 64×3×3 and a stride of ½)->a convolutional layer 5 (with a convolution kernel size of 32×3×3 and a stride of ½)->a convolutional layer 6 (with a convolution kernel size of 3×9×9 and a stride of 1)->a generated image.

The PatchGAN classifier is a network structure formed by successively connecting a convolutional layer module 1, a convolutional layer module 2, and a convolutional layer module 3. In some embodiments, each module can have the specific structure described below.

The convolutional layer module 1 is formed by a convolutional layer (with a convolution kernel size of 3×3, a stride of 2, and the channel number of 32), a batch normalization layer (BatchNorm), a ReLU activation layer, a convolutional layer (with a convolution kernel size of 3×3, a stride of 1, and the channel number of 32), a batch normalization layer (BatchNorm), a ReLU activation layer, and a maximum pooling layer (with a kernel size of 2×2 and a stride of 2).

The convolutional layer module 2 is formed by a convolutional layer (with a convolution kernel size of 3×3, a stride of 1, and the channel number of 64), a batch normalization layer (BatchNorm), a ReLU activation layer, a convolutional layer (with a convolution kernel size of 3×3, a stride of 1, and the channel number of 64), a batch normalization layer (BatchNorm), a ReLU activation layer, and a maximum pooling layer (with a kernel size of 2×2 and a stride of 2).

The convolutional layer module 3 is formed by a convolutional layer (with a convolution kernel size of 3×3, a stride of 1, and the channel number of 128), a batch normalization layer (BatchNorm), a ReLU activation layer, a convolutional layer (with a convolution kernel size of 3×3, a stride of 1, and the channel number of 128), a batch normalization layer (BatchNorm), a ReLU activation layer, a convolutional layer (with a convolution kernel size of 1×1, a stride of 1, and the channel number of 1), and a sigmoid activation layer.

At step 103, establish an objective loss function which combines an image translation loss and a model adaptive loss of the image translation network model.

The objective function can be the goal of optimization of the image translation network. The objective function can show performance of the image translation network, and further to incorporate evaluation of adaptability of translated data to a directed model. A specific process is as follows.

First, for ease of showing the objective function, the present disclosure defines some symbols as follows: A training dataset based on high-resolution remote sensing images is denoted as a source domain X: $\{x_i, s_i\}_{i=1}^{N} \in X$; and an unpaired cross-domain dataset is denoted as a target domain Y: $\{y_j\}_{j=1}^{M} \in Y$. $x_i$ denotes source-domain images, $s_i$ denotes source domain labels, $y_j$ denotes target-domain images which are unlabeled, N denotes the number of the source-domain images, M denotes the number of the target-domain images, and i,j denote sample subscripts of the source domain and the target domain respectively.

Secondly, in order to show the image translation performance of the image translation network, the present disclosure shows a performance loss of the network according to a principle of the used CycleGAN network. An unsupervised image translation network includes two generators and two domain-adversarial discriminators. The two generators respectively implement forward mapping G:X→Y and backward mapping F:Y→X, and the two domain-adversarial discriminators are a source domain discriminator Dx and a target domain discriminator Dy. Dx is used to distinguish the source-domain images X from generated images F(y) corresponding to the target-domain images, and Dy is used to distinguish the target-domain images Y from generated images G(x) corresponding to the source-domain images. Therefore, in order to measure the difference between a distribution of the generated images and that of target images, an adversarial loss is used herein to supervise the performance of the forward mapping G:X→Y and the backward mapping F:Y→X. An adversarial loss $L_{GAN}(G, D_Y, X, Y)$ in the forward mapping G and an adversarial loss $L_{GAN}(D_X, X, Y)$ in the backward mapping F are shown as follows:

$$L_{GAN}(G,D_Y,X,Y)=E_{y \sim p_{data}(y)}[\log D_Y(y)]+E_{x \sim p_{data}(x)}[\log (1-D_Y(G(x)))]$$

$$L_{GAN}(F,D_X,X,Y)=E_{x \sim p_{data}(x)}[\log D_X(x)]+E_{y \sim p_{data}(y)}[\log (1-D_X(F(y)))]$$

where G denotes the forward mapping, F denotes the backward mapping, $D_Y$ denotes the target domain discriminator, $D_X$ denotes the source domain discriminator, X denotes the source domain, and Y denotes the target domain; $y \sim p_{data(y)}$ denotes target-domain images conforming to a probability distribution $p_{data(y)}$ of the target domain, $E_{y \sim p_{data(y)}}$ denotes expectations of the target-domain images conforming to the probability distribution $p_{data(y)}$ of the target domain, $x \sim p_{data(x)}$ denotes source-domain images conforming to a probability distribution $p_{data(x)}$ of the source domain, and $E_{x \sim p_{data(x)}}$ denotes expectations of the source-domain images conforming to the probability distribution $p_{data(x)}$ of the source domain; $D_Y(y)$ denotes a judgment whether true target-domain data y belongs to the target domain, $D_X(x)$ denotes a judgment whether true source-domain data x belongs to the source domain, and G(x) denotes images which are generated after the source-domain images are subjected to forward mapping with the forward generator and conform to the probability distribution of the target domain; and $D_Y(G(X))$ denotes a judgment whether the generated images G(x) corresponding to the source-domain images belong to the target domain, F(y) denotes images which are generated after the target-domain images are subjected to backward mapping with the backward generator and conform to the probability distribution of the source domain, and $D_X(F(y))$ denotes a judgment whether the generated images F(y) corresponding to the target-domain images belong to the source domain.

In addition, during unsupervised image translation, in order to prevent forward mapping G and backward mapping F from contradicting each other, the network uses a cycle consistency loss $L_{cyc}(G,F)$ to make the source-domain images and the target-domain images supervise each other:

$$L_{cyc}(G,F)=E_{x \sim p_{data}(x)}[\|F(G(x))-x\|_1]+E_{y \sim p_{data}(y)}[\|G(F(y))-y\|_1].$$

In the formula, $\|F(G(x))-x\|_1$ denotes L1 norm between reconstructed images corresponding to the source-domain images and the source-domain images, where the reconstructed images are obtained after the source-domain images x are subjected to the forward mapping G and the backward mapping F sequentially. $\|G(F(y))-y\|_1$ denotes L1 norm between reconstructed images corresponding to the target-domain images and the target-domain images, where the reconstructed images are obtained after the target-domain images y are subjected to the backward mapping F and the forward mapping G sequentially. F(G(X)) denotes the reconstructed images corresponding to the source-domain images and generated after the source-domain images x are subjected to the forward mapping G and the backward mapping F sequentially, and G(F(y)) denotes the reconstructed images corresponding to the target-domain images and generated after the target-domain images y are subjected to the backward mapping F and the forward mapping G sequentially.

The adversarial loss and the cycle consistency loss evaluate image translation performance of the image translation network. However, applicability of translated images to a directed model (a particular semantic segmentation network) is unknown. Therefore, the present disclosure further defines a model adaptive loss $L_M(S,M(g(Te)))$, so as to evaluate a performance loss when translated data is applied in a target model. The model adaptive loss $L_M(S,M(g(Te)))$ is specifically as follows:

$$L_M(S, M(g(Te))) = \left\| 1 - \frac{\sum_{i=1}^{K} IoU(S_i, M(G(x_i)))}{K} \right\|$$

$$S_i \in S, x_i \in Te, 0 \le i \le K$$

where S denotes a label set of a source domain test set, $s_i$ denotes a true label corresponding to the ith sample in the source domain test set, Te denotes the source domain test set, $x_i$ denotes the ith sample in the source domain test set, and K denotes the number of samples in the source domain test set; M(·) denotes a semantic segmentation model, IoU(·) denotes an Intersection over Union (IoU) calculation function, and $M(G(x_i))$ denotes a predicted label obtained after a generated image $G(x_i)$ corresponding to a source-domain image of the ith sample is predicted by using the semantic segmentation model M(·); M(g(Te)) denotes a predicted label set for the source domain test set, that is obtained after generated images corresponding to the source-domain images of all the samples in the source domain test set are predicted by using the semantic segmentation model M(·); and $IoU(s_1,M(G(x_i)))$ denotes an IoU index between a true label and a predicted label which are corresponding to the ith sample.

To sum up, in order to introduce the performance of the current directed model in the image translation process, embodiments of the present disclosure can combine the adversarial loss, the cycle consistency loss, and the model adaptive loss of the image translation network, to obtain a final objective function $L(G,F,D_X,D_Y,M)$. The function $L(G,F,D_X,D_Y,M)$ has the following specific formula:

$$L(G,F,D_X,D_Y,M)=L_{GAN}(G,D_Y,X,Y)+L_{GAN}(F,D_X,X,Y)+\lambda L_{cyc}(G,F)+\varphi L_M(S,M(g(Te)))$$

where λ denotes a first hyper-parameter and φ denotes a second hyper-parameter which are used to control relative importance of the three objectives. Finally, the objective function maximizes capabilities of the discriminators for the two domains, minimizes the difference between the generated images and the target images, and further minimizes a performance loss of the semantic segmentation network M(·).

Parameters are initialized to prepare for training of the image translation network. Embodiments of the present disclosure can randomly initialize the parameters of the image translation network, and set $L_M(S,M(g(Te)))$ to 1 which is a maximum value of the performance loss.

At step 104, train the image translation network model by using the training data sample set to obtain a trained image translation network model.

The step 104 of training the image translation network model to obtain a trained image translation network model can include: acquiring a preset number of training data samples from the training data sample set, and grouping the samples into a training data sample subset; inputting the ith training data sample in the training data sample subset into the image translation network model, and calculating a numerical value of the objective loss function of the image translation network model; feeding back the numerical value of the objective loss function to the forward generator and the backward generator of the image translation network model, to update parameters of the forward generator and the backward generator; determining whether a numerical value of i is less than the preset number, to obtain a second determining result; if the second determining result is yes, adding 1 to the numerical value of i, and returning to the step of "inputting the ith training data sample in the training data sample subset into the image translation network model, and calculating a numerical value of the objective loss function of the image translation network model"; if the second determining result is no, letting the numerical value of i equal 1; inputting a source-domain image of the ith training data sample in the training data sample subset into the forward generator of the image translation network model, and carrying out forward mapping, to obtain a generated image corresponding to the source-domain image; inputting the generated image corresponding to the source-domain image into the backward generator of the image translation network model, and carrying out backward mapping, to obtain a reconstructed image corresponding to the source-domain image; inputting a target-domain image of the ith training data sample in the training data sample subset into the backward generator of the image translation network model, and carrying out backward mapping, to obtain a generated image corresponding to the target-domain image; and inputting the generated image corresponding to the target-domain image into the forward generator of the image translation network model, and carrying out forward mapping, to obtain a reconstructed image corresponding to the target-domain image; updating a weight of the source domain discriminator according to losses in determining, by the source domain discriminator, whether the generated image corresponding to the target-domain image belongs to the source domain and whether the source-domain image belongs to the source domain; updating a weight of the target domain discriminator according to losses in determining, by the target domain discriminator, whether the generated image corresponding to the source-domain image belongs to the target domain and whether the target-domain image belongs to the target domain; determining whether the numerical value of i is less than the preset number, to obtain a third determining result; if the third determining result is yes, adding 1 to the numerical value of i, and returning to the step of "inputting a source-domain image of the ith training data sample in the training data sample subset into the forward generator of the image translation network model, and carrying out forward mapping, to obtain a generated image corresponding to the source-domain image; inputting the generated image corresponding to the source-domain image into the backward generator of the image translation network model, and carrying out backward mapping, to obtain a reconstructed image corresponding to the source-domain image; inputting a target-domain image of the ith training data sample in the training data sample subset into the backward generator of the image translation network model, and carrying out backward mapping, to obtain a generated image corresponding to the target-domain image; and inputting the generated image corresponding to the target-domain image into the forward generator of the image translation network model, and carrying out forward mapping, to obtain a reconstructed image corresponding to the target-domain image"; if the third determining result is no, determining whether the number of iterations reaches a threshold of the number of iterations, to obtain a fourth determining result; and if the fourth determining result is no, adding 1 to the number of iterations, and returning to the step of "acquiring a preset number of training data samples from the training data sample set, and grouping the samples into a training data sample subset"; or if the fourth determining result is yes, outputting an updated image translation network model as the trained image translation network model.

The step of inputting the ith training data sample in the training data sample subset into the image translation network model, and calculating a numerical value of the objective loss function of the image translation network model specifically includes: inputting the source-domain image of the ith training data sample in the training data sample subset into the forward generator of the image translation network model, and carrying out forward mapping, to obtain the generated image corresponding to the source-domain image; inputting the generated image corresponding to the source-domain image into the backward generator of the image translation network model, and carrying out backward mapping, to obtain the reconstructed image corresponding to the source-domain image; inputting the target-domain image of the ith training data sample in the training data sample subset into the backward generator of the image translation network model, and carrying out backward mapping, to obtain the generated image corresponding to the target-domain image; and inputting the generated image corresponding to the target-domain image into the forward generator of the image translation network model, and carrying out forward mapping, to obtain the reconstructed image corresponding to the target-domain image; according to results of determining, by the source domain discriminator, whether the source-domain image belongs to the source domain and whether the generated image for the target domain belongs to the source domain, calculating a value of an adversarial loss function for the backward mapping by using a formula: $L_{GAN}(F,D_X,X,Y)=E_{x \sim p_{data}(x)}[\log D_X(x)]+E_{y \sim p_{data}(y)}[\log (1-D_X(F(y)))]$; according to results of determining, by the target domain discriminator, whether the target-domain image belongs to the target domain and whether the generated image for the source domain belongs to the target domain, calculating a value of an adversarial loss function for the forward mapping by using a formula: $L_{GAN}(G,D_Y, X,Y)=E_{y \sim p_{data}(y)}[\log D_Y(y)]+E_{x \sim p_{data}(x)}[\log (1-D_Y(G(x)))]$; according to a difference value between the source-domain image and the reconstructed image corresponding to the source-domain image and a difference value between the target-domain image and the reconstructed image corresponding to the target-domain image, calculating a value of a cycle consistency loss function by using a formula: $L_{cyc}(G,F)=E_{x \sim p_{data}(x)}[\|F(G(x))-x\|_1]+E_{y \sim p_{data}(y)}[\|G(F(y))-y\|_1]$; calculating a value of a model adaptive loss function of the image translation network model by using a formula:

$$L_M(S, M(g(Te))) = \left\| 1 - \frac{\sum_{i=1}^{K} IoU(S_i, M(G(x_i)))}{K} \right\|$$

$s_i \in S, x_i \in Te$, $0 \le i \le K$; and according to the value of the adversarial loss function for the backward mapping, the value of the adversarial loss function for the forward mapping, the value of the cycle consistency loss function, and the value of the model adaptive loss function, calculating the numerical value of the objective loss function of the image translation network model by using a formula: $L(G,F,D_X,D_Y,M)=L_{GAN}(G,D_Y,X,Y)\ L_{GAN}(F\ D_X,X,Y)+\lambda L_{cyc}(G,F)+\varphi L_M(S,M(g(Te)))$.

Specifically, source-domain data and target-domain data have no paired images. Therefore, it is required to reconstruct the source-domain data and the target-domain data by using randomly initialized generators. A process is as follows: By using the source-domain data X as an input in forward mapping G, the source-domain data X is mapped into generated images G(X) with the same distribution as the target-domain data Y by means of the forward mapping G in the image translation network; and then the generated images G(X) are used as an input in backward mapping F, to generate reconstructed images F(G(X)) corresponding to the source-domain data. Likewise, by using the target-domain data Y as an input in backward mapping F, images F(Y) with the same distribution as the source-domain data are generated; and then the generated images F(Y) are used as an input in forward mapping G, to generate reconstructed images G(F(Y)) with the same distribution as the target-domain data.

Afterwards, on one hand, a domain classifier $D_X$ is used to distinguish the source-domain reconstructed images F(G(X)) from the source-domain data X, to update parameters of the domain classifier $D_X$; on the other hand, a domain classifier $D_Y$ is used to distinguish the target-domain reconstructed images G(F(Y)) from the target-domain data Y, to update parameters of the domain classifier $D_Y$.

Finally, the parameters of the domain classifiers $D_X$ and $D_Y$ are fixed to optimize and update parameters for the forward mapping G and backward mapping F. The foregoing process can be repeated, and the two mapping procedures of the generators and the domain classifiers can constantly compete with each other to optimize and update the parameters, thus finding out better network parameters for translation of the source-domain data into the target-domain data.

At step 105, input the labeled source-domain images into the trained image translation network model to translate the labeled source-domain images into target-domain transferred images; by using labels of the labeled source-domain images as labels of the transferred images, establish a data sample set for fine tuning; and classify the data sample set for fine tuning into a training set and a test set.

Because the source-domain images have labels, image content keeps unchanged but an image distribution is changed after the source-domain images are translated into the transferred images with the same distribution as the target-domain images. Therefore, according to embodiments of the present disclosure, the labels of the source-domain images are used as the labels of the transferred images, and transferred data G (X) obtained by forward mapping and the corresponding labels $s_i$ are classified into a training set Tr and a test set Te. The training set Tr is used to fine-tune the trained directed semantic segmentation network (namely, the directed model) based on high-resolution remote sensing images, to obtain a fine-tuned network $\hat{M}$.

At step 106, fine-tune the semantic segmentation model of the trained image translation network model by using the training set such that the model adaptive loss is less than a threshold of the model adaptive loss, to obtain a fine-tuned image translation network model.

A specific fine-tuning manner may be selected according to a degree of difference between the source-domain data and the target-domain data. For high-resolution remote sensing images which slightly differ in content, network parameters of the first few layers of the directed model are frozen, and network parameters of the last few layers of the directed model are updated by using the training set Tr. On the contrary, for greatly different high-resolution remote sensing images, all network parameters of the directed model are updated, to improve adaptability of the target-domain data to the directed model.

At step 107, input the test set into the fine-tuned image translation network model, and calculate a value of the objective loss function of the fine-tuned image translation network model.

At step 108, determine whether the value of the objective loss function is less than a threshold of the objective loss function, to obtain a first determining result.

If the first determining result is no, the step of "training the image translation network model by using the training data sample set, to obtain a trained image translation network model" is performed (which is not shown in FIG. 1), to train and fine-tune the fine-tuned image translation network model once again.

At step 109, if the first determining result is yes, output the fine-tuned image translation network model as the trained image translation network model.

The steps 107 to 109 can include: inputting the test set Te into the fine-tuned network to predict labels $\hat{M}$(G(Te)), to obtain predicted labels of the test set Te; and calculating a model adaptive loss $L_M$(S,M(g(Te))) by using the predicted labels and true labels $s_i$ corresponding to the source-domain data; updating the objective function $L(G,F,D_X,D_Y,M)$; and feeding back $L_M$(S,M(g(Te))) to the image translation network, to update the objective function $L(G,F,D_X,D_Y,M)$; and repeating the steps following the step 103 until $L_M$(S,M(g(Te))) is less than H, where H denotes a value of a maximum acceptable loss.

At step 110, input the high-resolution remote sensing images to be processed in the source domain into the trained image translation network model, to obtain target-domain translated images; and transfer the target-domain translated images in a directed manner.

A system for directed transfer of cross-domain data based on high-resolution remote sensing images is provided, where the directed transfer system include the following.

The system can include a module for establishing a training data sample set, configured to acquire labeled source-domain images and unlabeled target-domain images, to establish a training data sample set, where training data samples include source-domain images, true labels of the source-domain images, and target-domain images; and the source-domain images, the true labels of the source-domain images, and the target-domain images are respectively formed in a source-domain image set, a source-domain image label set, and a target-domain image set;

The system can include a module for establishing an image translation network model, configured to establish an image translation network model for directed transfer of cross-domain data of high-resolution remote sensing images, where the image translation network model includes two generators, two discriminators, and a semantic segmentation model; the two generators are a forward generator and a backward generator, and the two discriminators are a target domain discriminator and a source domain discriminator; the generator is formed by successively connecting one reflection padding layer, three convolutional layers, five residual blocks, and three convolutional layers; and the discriminator is formed by successively connecting a first convolutional layer module, a second convolutional layer module, and a third convolutional layer module.

The system can include an objective loss function establishing module, configured to establish an objective loss function which combines an image translation loss and a model adaptive loss of the image translation network model.

The objective loss function establishing module specifically can include: an adversarial loss function establishing submodule, configured to establish adversarial loss functions $L_{GAN}(G,D_Y,X,Y)$ and $L_{GAN}(F,D_X,X,Y)$ respectively corresponding to forward mapping and backward mapping of the image translation network model:

$$L_{GAN}(G,D_Y,X,Y)=E_{y\sim p_{data}(y)}[\log D_Y(y)]+E_{x\sim p_{data}(x)}[\log (1-D_Y(G(x)))]$$

$$L_{GAN}(F,D_X,X,Y)=E_{x\sim p_{data}(x)}[\log D_X(x)]+E_{y\sim p_{data}(y)}[\log (1-D_X(F(y)))]$$

where G denotes the forward mapping, F denotes the backward mapping, $D_Y$ denotes the target domain discriminator, $D_X$ denotes the source domain discriminator, X denotes the source domain, and Y denotes the target domain; $y\sim p_{data(y)}$ denotes target-domain images conforming to a probability distribution $p_{data(y)}$ of the target domain, $E_{y\sim p_{data}(y)}$ denotes expectations of the target-domain images conforming to the probability distribution $p_{data(y)}$ of the target domain, $x\sim p_{data(x)}$ denotes source-domain images conforming to a probability distribution $p_{data(x)}$ of the source domain, and $E_{x\sim p_{data}(x)}$ denotes expectations of the source-domain images conforming to the probability distribution $p_{data(x)}$ of the source domain; $D_Y(y)$ denotes a judgment whether true target-domain data y belongs to the target domain, $D_X(x)$ denotes a judgment whether true source-domain data x belongs to the source domain, and G(x) denotes images which are generated after the source-domain images are subjected to forward mapping with the forward generator and conform to the probability distribution of the target domain; and $D_Y(G(x))$ denotes a judgment whether the generated images G(x) corresponding to the source-domain images belong to the target domain, F(y) denotes images which are generated after the target-domain images are subjected to backward mapping with the backward generator and conform to the probability distribution of the source domain, and $D_X(F(y))$ denotes a judgment whether the generated images F(y) corresponding to the target-domain images belong to the source domain.

The system can include a cycle consistency loss function establishing submodule, configured to establish a cycle consistency loss function $L_{cyc}(G,F)$ of the image translation network model:

$$L_{cyc}(G,F)=E_{x\sim p_{data}(x)}[\|F(G(x))-x\|_1]+E_{y\sim p_{data}(y)}[\|G(F(y))-y\|_1]$$

where F(G(x)) denotes reconstructed images corresponding to the source-domain images and generated after the source-domain images x are subjected to the forward mapping G and the backward mapping F sequentially, and G(F(y)) denotes reconstructed images corresponding to the target-domain images and generated after the target-domain images y are subjected to the backward mapping F and the forward mapping G sequentially.

The system can include an adaptive loss function establishing submodule, configured to establish a model adaptive loss function of the image translation network model:

$$L_M(S, M(g(Te))) = \left\|1 - \frac{\sum_{i=1}^{K} IoU(S_i, M(G(x_i)))}{K}\right\|$$

$$S_i \in S, x_i \in Te, 0 \le i \le K$$

where S denotes a label set of a source domain test set, $s_i$ denotes a true label corresponding to the ith sample in the source domain test set, Te denotes the source domain test set, $x_i$ denotes the ith sample in the source domain test set, and K denotes the number of samples in the source domain test set; $M(\cdot)$ denotes a semantic segmentation model, $IoU(\cdot)$ denotes an Intersection over Union (IoU) calculation function, and $M(G(x_i))$ denotes a predicted label obtained after a generated image $G(x_i)$ corresponding to a source-domain image of the ith sample is predicted by using the semantic segmentation model $M(\cdot)$; M(g(Te)) denotes a predicted label set for the source domain test set, that is obtained after generated images corresponding to the source-domain images of all the samples in the source domain test set are predicted by using the semantic segmentation model $M(\cdot)$; and $IoU(s_i,M(G(x_i)))$ denotes an IoU index between a true label and a predicted label which are corresponding to the ith sample.

The system can include an objective loss function establishing submodule, configured to establish the objective loss function $L(G,F,D_X,D_Y,M)$ which combines the image translation loss and the model adaptive loss of the image translation network model:

$$L(G,F,D_X,D_Y,M)=L_{GAN}(G,D_Y,X,Y)+L_{GAN}(F,D_X,X,Y)+\lambda L_{cyc}(G,F)+\varphi L_M(S,M(g(Te)))$$

where λ denotes a first hyper-parameter and φ denotes a second hyper-parameter.

The system further includes a training module, which is configured to train the image translation network model to obtain a trained image translation network model.

The training module can include: a selection submodule for forming a training data sample subset, configured to acquire a preset number of training data samples from the training data sample set, and group the samples into a training data sample subset; an objective loss function calculation submodule, configured to input the ith training data sample in the training data sample subset into the image translation network model, and calculate a numerical value of the objective loss function of the image translation network model; a submodule for updating parameters of a forward generator and a backward generator, configured to feed back the numerical value of the objective loss function to the forward generator and the backward generator of the image translation network model, to update parameters of the forward generator and the backward generator; a second determining submodule, configured to determine whether a numerical value of i is less than the preset number, to obtain a second determining result; a first returning submodule, configured to: if the second determining result is yes, add 1 to the numerical value of i, and return to the step of "inputting the ith training data sample in the training data sample subset into the image translation network model, and calculating a numerical value of the objective loss function of the image translation network model"; a value initialization submodule, configured to: if the second determining result is no, let the numerical value of i equal 1; an image reconstruction submodule, configured to input a source-domain image of the ith training data sample in the training data sample subset into the forward generator of the image translation network model, and carry out forward mapping, to obtain a generated image corresponding to the source-domain image; input the generated image corresponding to the source-domain image into the backward generator of the image translation network model, and carry out backward mapping, to obtain a reconstructed image corresponding to the source-domain image; input a target-domain image of the ith training data sample in the training data sample subset into the backward generator of the image translation network model, and carry out backward mapping, to obtain a generated image corresponding to the target-domain image; and input the generated image corresponding to the target-domain image into the forward generator of the image translation network model, and carry out forward mapping, to obtain a reconstructed image corresponding to the target-domain image; a submodule for updating a weight of the source domain discriminator, configured to update a weight of the source domain discriminator according to losses in determining, by the source domain discriminator, whether the generated image corresponding to the target-domain image belongs to the source domain and whether the source-domain image belongs to the source domain; a submodule for updating a weight of the target domain discriminator, configured to update a weight of the target domain discriminator according to losses in determining, by the target domain discriminator, whether the generated image corresponding to the source-domain image belongs to the target domain and whether the target-domain image belongs to the target domain; a third determining submodule, configured to determine whether the numerical value of i is less than the preset number, to obtain a third determining result; a second returning submodule, configured to: if the third determining result is yes, add 1 to the numerical value of i, and return to the step of "inputting a source-domain image of the ith training data sample in the training data sample subset into the forward generator of the image translation network model, and carrying out forward mapping, to obtain a generated image corresponding to the source-domain image; inputting the generated image corresponding to the source-domain image into the backward generator of the image translation network model, and carrying out backward mapping, to obtain a reconstructed image corresponding to the source-domain image; inputting a target-domain image of the ith training data sample in the training data sample subset into the backward generator of the image translation network model, and carrying out backward mapping, to obtain a generated image corresponding to the target-domain image; and inputting the generated image corresponding to the target-domain image into the forward generator of the image translation network model, and carrying out forward mapping, to obtain a reconstructed image corresponding to the target-domain image"; a fourth determining submodule, configured to: if the third determining result is no, determine whether the number of iterations reaches a threshold of the number of iterations, to obtain a fourth determining result; a third returning submodule, configured to: if the fourth determining result is no, add 1 to the number of iterations, and return to the step of "acquiring a preset number of training data samples from the training data sample set, and grouping the samples into a training data sample subset"; and a result output submodule, configured to: if the fourth determining result is yes, output an updated image translation network model as the trained image translation network model.

The objective loss function calculation submodule can include: an image reconstruction unit, configured to input the source-domain image of the ith training data sample in the training data sample subset into the forward generator of the image translation network model, and carry out forward mapping, to obtain the generated image corresponding to the source-domain image; input the generated image corresponding to the source-domain image into the backward generator of the image translation network model, and carry out backward mapping, to obtain the reconstructed image corresponding to the source-domain image; input the target-domain image of the ith training data sample in the training data sample subset into the backward generator of the image translation network model, and carry out backward mapping, to obtain the generated image corresponding to the target-domain image; and input the generated image corresponding to the target-domain image into the forward generator of the image translation network model, and carry out forward mapping, to obtain the reconstructed image corresponding to the target-domain image; a unit for calculating the adversarial loss function for the backward mapping, configured to: according to results of determining, by the source domain discriminator, whether the source-domain image belongs to the source domain and whether the generated image for the target domain belongs to the source domain, calculate a value of the adversarial loss function for the backward mapping by using a formula: $L_{GAN}(F,D_X,X,Y) = E_{x \sim p_{data}(x)}[\log D_X(x)] + E_{y \sim p_{data}(y)}[\log (1-D_X(F(y)))]$; a unit for calculating the adversarial loss function for the forward mapping, configured to: according to results of determining, by the target domain discriminator, whether the target-domain image belongs to the target domain and whether the generated image for the source domain belongs to the target domain, calculate a value of the adversarial loss function for the forward mapping by using a formula: $L_{GAN}(G,D_Y,X,Y) = E_{y \sim p_{data}(y)}[\log D_Y(y)] + E_{x \sim p_{data}(x)}[\log(1-D_Y(G(x)))]$; a unit for calculating the cycle consistency loss function, configured to: according to a difference value between the source-domain image and the reconstructed image corresponding to the source-domain image and a difference value between the target-domain image and the reconstructed image corresponding to the target-domain image, calculate a value of the cycle consistency loss function by using a formula: $L_{cyc}(G,F) = E_{x \sim p_{data}(x)}[\|F(G(X))-x\|_1] + E_{y \sim p_{data}(y)}[\|G(F(y))-y\|_1]$; and calculate a value of the model adaptive loss function of the image translation network model by using a formula:

$$L_M(S, M(g(Te))) = \left\| 1 - \frac{\sum_{i=1}^{K} IoU(S_i, M(G(x_i)))}{K} \right\|$$

$s_i \in S$, $x_t \in Te$, $0 \leq i \leq K$; and an objective loss function calculation unit, configured to: according to the value of the adversarial loss function for the backward mapping, the value of the adversarial loss function for the forward mapping, the value of the cycle consistency loss function, and the value of the model adaptive loss function, calculate the numerical value of the objective loss function of the image translation network model by using a formula: $L(G,F,D_X, D_Y,M)=L_{GAN}(G,D_Y \ X,Y)+L_{GAN}(F,D_X,X,Y)+\lambda L_{cyc}(G,F)+\varphi L_M(S,M(g(Te)))$.

According to specific embodiments provided by the present disclosure, the following technical effects can be achieved.

Embodiments of the present disclosure can be proposed on the premise that a directed semantic segmentation model has been trained with a training data set, and training samples and labels are obtainable. Secondly, the present disclosure defines a performance loss function for the semantic segmentation model when cross-domain data is applied in the model, and then a new objective function is constructed by combining the performance loss function and a loss function of a GAN network. In the objective function, the loss function of the GAN network can guarantee image-to-image translation, and further the performance of the target task is supervised by incorporating the performance loss of the target model. In addition, a cycle training policy of the fine-tuned network guarantees that the image translation network keeps translation towards the effect desired by the target model, preventing "over-interpreted" or "over-simplified" translated images from adversely affecting fine tuning of the directed model.

The embodiments in the specification are described progressively. Each embodiment emphasizes a part different from other embodiments, and identical or similar parts of the embodiments may be obtained with reference to each other.

The principles and implementations of the present invention have been described with reference to specific embodiments. The description of the above embodiments is only for facilitating understanding of the method and the core idea of the present invention, and the described embodiments are only a part of the embodiments of the present invention. All other embodiments obtained by persons of ordinary skill in the art based on the embodiments of the present invention without creative efforts fall within the scope of protection of the present invention.

What is claimed is:

1. A method for directed transfer of cross-domain data based on high-resolution remote sensing images, wherein the directed transfer method comprises the following steps:

acquiring labeled source-domain images and unlabeled target-domain images, to establish a training data sample set, wherein training data samples comprise source-domain images, true labels of the source-domain images, and target-domain images; and the source-domain images, the true labels of the source-domain images, and the target-domain images are respectively formed in a source-domain image set, a source-domain image label set, and a target-domain image set;

establishing an image translation network model for directed transfer of cross-domain data of high-resolution remote sensing images;

establishing an objective loss function which combines an image translation loss and a model adaptive loss of the image translation network model;

training the image translation network model by using the training data sample set, to obtain a trained image translation network model;

inputting the labeled source-domain images into the trained image translation network model to translate the labeled source-domain images into target-domain transferred images;

by using labels of the labeled source-domain images as labels of the transferred images, establishing a data sample set for fine tuning; and classifying the data sample set for fine tuning into a training set and a test set;

fine-tuning a semantic segmentation model of the trained image translation network model by using the training set such that the model adaptive loss is less than a threshold of the model adaptive loss, to obtain a fine-tuned image translation network model;

inputting the test set into the fine-tuned image translation network model, and calculating a value of the objective loss function of the fine-tuned image translation network model;

determining whether the value of the objective loss function is less than a threshold of the objective loss function, to obtain a first determining result;

if the first determining result is that the value of the objective loss function is not less than the threshold, returning to the step of "training the image translation network model by using the training data sample set, to obtain a trained image translation network model", to train and fine-tune the fine-tuned image translation network model once again;

if the first determining result is that the value of the objective loss function is less than the threshold, outputting the fine-tuned image translation network model as the trained image translation network model; and inputting the high-resolution remote sensing images to be processed in a source domain into the trained image translation network model, to obtain target-domain translated images; and transferring the target-domain translated images in a directed manner;

wherein the image translation network model comprises two generators, two discriminators, and the semantic segmentation model; the two generators are a forward generator and a backward generator; and the two discriminators are a target domain discriminator and a source domain discriminator;

the generator is formed by successively connecting one reflection padding layer, three convolutional layers, five residual blocks, and three convolutional layers; and the discriminator is formed by successively connecting a first convolutional layer module, a second convolutional layer module, and a third convolutional layer module;

wherein the step of establishing an objective loss function which combines an image translation loss and a model adaptive loss of the image translation network model specifically comprises:

establishing adversarial loss functions $L_{GAN}(G,D_y,X,Y)$ and $L_{GAN}(F,D_x,X,Y)$ respectively corresponding to forward mapping and backward mapping of the image translation network model:

$$L_{GAN}(G,D_Y,X,Y)=E_{y\sim p_{data}(y)}[\log D_Y(y)]+E_{x\sim p_{data}(x)}[\log(1-D_Y(G(x)))]$$

$$L_{GAN}(F,D_X,X,Y)=E_{x\sim p_{data}(x)}[\log D_X(x)]+E_{y\sim p_{data}(y)}[\log(1-D_X(F(y)))]$$

wherein G denotes the forward mapping, F denotes the backward mapping, $D_y$ denotes the target domain discriminator, $D_x$ denotes the source domain discriminator, X denotes the source domain, and Y denotes the target domain; $y\sim p_{data(y)}$ denotes target-domain images conforming to a probability distribution $p_{data(y)}$ of the target domain, $E_{y\sim p_{data}(y)}$ denotes expectations of the target-domain images conforming to the probability distribution $p_{data(y)}$ of the target domain, $x\sim p_{data(x)}$ denotes source-domain images conforming to a probability distribution $p_{data(x)}$ of the source domain, and $E_{x\sim p_{data}(x)}$ denotes expectations of the source-domain images conforming to the probability distribution $p_{data(x)}$ of the source domain; $D_y(y)$ denotes a judgment whether true target-domain data y belongs to the target domain, $D_x(x)$ denotes a judgment whether true source-domain data x belongs to the source domain, and G(x) denotes images which are generated after the source-domain images are subjected to forward mapping with the forward generator and conform to the probability distribution of the target domain; and $D_y(G(x))$ denotes a judgment whether the generated images G(x) corresponding to the source-domain images belong to the target domain, F(y) denotes images which are generated after the target-domain images are subjected to backward mapping with the backward generator and conform to the probability distribution of the source domain, and $D_x(F(y))$ denotes a judgment whether the generated images F(y) corresponding to the target-domain images belong to the source domain;

establishing a cycle consistency loss function $L_{cyc}(G,F)$ of the image translation network model:

$$L_{cyc}(G,F)=E_{x\sim p_{data}(x)}[\|F(G(x))-x\|_1]+E_{y\sim p_{data}(y)}[\|G(F(y))-y\|_1]$$

wherein F(G(x)) denotes reconstructed images corresponding to the source-domain images and generated after the source-domain images x are subjected to the forward mapping G and the backward mapping F sequentially, and G(F(y)) denotes reconstructed images corresponding to the target-domain images and generated after the target-domain images y are subjected to the backward mapping F and the forward mapping G sequentially;

establishing a model adaptive loss function $L_M(S,M(g(Te)))$ of the image translation network model:

$$L_M(S,M(g(Te)))=\|1-\Sigma_{i=1}^{K}IoU(s_i,M(G(x_i)))/K\|_{s_i\in S, x_i\in Te, 0\le i\le K}$$

wherein S denotes a label set of the source-domain images, $s_i$ denotes a true label corresponding to a source-domain image in the source-domain image set, Te denotes the source-domain image set, $x_i$ denotes the source-domain image in the source-domain image set, and K denotes a number of the source-domain images in the source-domain image set; M(·) denotes a semantic segmentation model, IoU(·) denotes an Intersection over Union (IoU) calculation function, and $M(G(x_i))$ denotes a predicted label obtained after a generated image $G(x_i)$ corresponding to the source-domain image is predicted by using the semantic segmentation model M(·); M(g(Te)) denotes a predicted label set for the source-domain image set, that is obtained after generated images corresponding to all the source-domain images in the source-domain image set are predicted by using the semantic segmentation model M(·); and IoU $(s_i,M(G(x_i)))$ denotes an IoU index between a true label and a predicted label that are corresponding to the source-domain image; and establishing the objective loss function $L(G,F,D_x,D_y,M)$ which combines the image translation loss and the model adaptive loss of the image translation network model:

$$L(G,F,D_X,D_Y,M)=L_{GAN}(G,D_Y,X,Y)+L_{GAN}(F,D_X,X,Y)+\lambda L_{cyc}(G,F)+\varphi L_M(S,M(g(Te)))$$

wherein λ denotes a first hyper-parameter and φ denotes a second hyper-parameter.

2. The method for directed transfer of cross-domain data based on high-resolution remote sensing images according to claim 1, wherein the step of training the image translation network model by using the training data sample set, to obtain a trained image translation network model specifically comprises:

acquiring a preset number of training data samples from the training data sample set, and grouping the samples into a training data sample subset;

inputting a training data sample in the training data sample subset into the image translation network model, and calculating a numerical value of the objective loss function of the image translation network model;

feeding back the numerical value of the objective loss function to the forward generator and the backward generator of the image translation network model, to update parameters of the forward generator and the backward generator;

determining whether a numerical value of i is less than the preset number, to obtain a second determining result;

if the second determining result is yes, adding 1 to the numerical value of i, and returning to the step of "inputting the training data sample in the training data sample subset into the image translation network model, and calculating a numerical value of the objective loss function of the image translation network model";

if the second determining result is no, letting the numerical value of i equal 1;

inputting a source-domain image of the training data sample in the training data sample subset into the forward generator of the image translation network model, and carrying out forward mapping, to obtain a generated image corresponding to the source-domain image;

inputting the generated image corresponding to the source-domain image into the backward generator of the image translation network model, and carrying out backward mapping, to obtain a reconstructed image corresponding to the source-domain image; inputting a target-domain image of the training data sample in the training data sample subset into the backward generator of the image translation network model, and carrying out backward mapping, to obtain a generated image corresponding to the target-domain image; and inputting the generated image corresponding to the target-domain image into the forward generator of the image translation network model, and carrying out forward mapping, to obtain a reconstructed image corresponding to the target-domain image;

updating a weight of the source domain discriminator according to losses in determining, by the source domain discriminator, whether the generated image corresponding to the target-domain image belongs to the source domain and whether the source-domain image belongs to the source domain;

updating a weight of the target domain discriminator according to losses in determining, by the target domain discriminator, whether the generated image corresponding to the source-domain image belongs to the target domain and whether the target-domain image belongs to the target domain;

determining whether the numerical value of i is less than the preset number, to obtain a third determining result;

if the third determining result is yes, adding 1 to the numerical value of i, and returning to the step of "inputting a source-domain image of a training data sample in the training data sample subset into the forward generator of the image translation network model, and carrying out forward mapping, to obtain a generated image corresponding to the source-domain image;

inputting the generated image corresponding to the source-domain image into the backward generator of the image translation network model, and carrying out backward mapping, to obtain a reconstructed image corresponding to the source-domain image; inputting a target-domain image of the training data sample in the training data sample subset into the backward generator of the image translation network model, and carrying out backward mapping, to obtain a generated image corresponding to the target-domain image; and inputting the generated image corresponding to the target-domain image into the forward generator of the image translation network model, and carrying out forward mapping, to obtain a reconstructed image corresponding to the target-domain image";

if the third determining result is no, determining whether a number of iterations reaches a threshold of the number of iterations, to obtain a fourth determining result; and if the fourth determining result is no, adding 1 to the number of iterations, and returning to the step of "acquiring a preset number of training data samples from the training data sample set, and grouping the samples into a training data sample subset"; or if the fourth determining result is yes, outputting an updated image translation network model as the trained image translation network model.

3. The method for directed transfer of cross-domain data based on high-resolution remote sensing images according to claim 2, wherein the step of inputting the training data sample in the training data sample subset into the image translation network model, and calculating a numerical value of the objective loss function of the image translation network model specifically comprises:

inputting the source-domain image of the training data sample in the training data sample subset into the forward generator of the image translation network model, and carrying out forward mapping, to obtain the generated image corresponding to the source-domain image; inputting the generated image corresponding to the source-domain image into the backward generator of the image translation network model, and carrying out backward mapping, to obtain the reconstructed image corresponding to the source-domain image; inputting the target-domain image of the training data sample in the training data sample subset into the backward generator of the image translation network model, and carrying out backward mapping, to obtain the generated image corresponding to the target-domain image; and inputting the generated image corresponding to the target-domain image into the forward generator of the image translation network model, and carrying out forward mapping, to obtain the reconstructed image corresponding to the target-domain image;

according to results of determining, by the source domain discriminator, whether the source-domain image belongs to the source domain and whether the generated image for the target domain belongs to the source domain, calculating a value of an adversarial loss function for the backward mapping by using a formula: $L_{GAN}(F,D_X,X,Y)=E_{x\sim p_{data}(x)}[\log\ D_X(x)]\ E_{y\sim p_{data}(y)}[\log(1-D_X(F(y)))]$;

according to results of determining, by the target domain discriminator, whether the target-domain image belongs to the target domain and whether the generated image for the source domain belongs to the target domain, calculating a value of an adversarial loss function for the forward mapping by using a formula: $L_{GAN}(G,D_Y,X,Y)=E_{y\sim p_{data}(y)}[\log\ D_Y(y)]+E_{x\sim p_{data}(x)}[\log(1-D_Y(G(x)))]$;

according to a difference value between the source-domain image and the reconstructed image corresponding to the source-domain image and a difference value between the target-domain image and the reconstructed image corresponding to the target-domain image, calculating a value of the cycle consistency loss function by using a formula: $L_{cyc}(G,F)=E_{x\sim p_{data}(x)}[\|F(G(x))-x\|_1]+E_{y\sim p_{data}(y)}[\|G(F(y))-y\|_1]$;

calculating a value of a model adaptive loss function of the image translation network model by using a formula:

$$L_M(S, M(g(Te))) = \left\| 1 - \frac{\sum_{i=1}^{K} IoU(S_i, M(G(x_i)))}{K} \right\|$$

$S_i \in S, x_i \in Te, 0 \leq i \leq K;$ and according to the value of the adversarial loss function for the backward mapping, the value of the adversarial loss function for the forward mapping, the value of the cycle consistency loss function, and the value of the model adaptive loss function, calculating the numerical value of the objective loss function of the image translation network model by using a formula:

$L(G,F,D_X,D_Y,M)=L_{GAN}(G,D_Y,X,Y)+L_{GAN}(F,D_X,X,Y)F) \lambda L_{cyc}(G,F)+\varphi L_M(S,M(g(Te)))$.

4. A system for directed transfer of cross-domain data based on high-resolution remote sensing images, wherein the directed transfer system comprises:

a module for establishing a training data sample set, configured to acquire labeled source-domain images and unlabeled target-domain images, to establish a training data sample set, wherein training data samples comprise source-domain images, true labels of the source-domain images, and target-domain images; and the source-domain images, the true labels of the source-domain images, and the target-domain images are respectively formed in a source-domain image set, a source-domain image label set, and a target-domain image set;

a module for establishing an image translation network model, configured to establish an image translation network model for directed transfer of cross-domain data of high-resolution remote sensing images;

an objective loss function establishing module, configured to establish an objective loss function which combines an image translation loss and a model adaptive loss of the image translation network model;

a training module, configured to train the image translation network model by using the training data sample set, to obtain a trained image translation network model;

a module for establishing a data sample set, configured to input the labeled source-domain images into the trained image translation network model to translate the labeled source-domain images into target-domain transferred images; by using labels of the labeled source-domain images as labels of the transferred images, establish a data sample set for fine tuning; and classify the data sample set for fine tuning into a training set and a test set;

a fine tuning module, configured to fine-tune a semantic segmentation model of the trained image translation network model by using the training set such that the model adaptive loss is less than a threshold of the model adaptive loss, to obtain a fine-tuned image translation network model;

an objective loss function calculation module, configured to input the test set into the fine-tuned image translation network model, and calculate a value of the objective loss function of the fine-tuned image translation network model;

a first determining module, configured to determine whether the value of the objective loss function is less than a threshold of the objective loss function, to obtain a first determining result;

a returning module, configured to: if the first determining result is no, return to the step of "training the image translation network model by using the training data sample set, to obtain a trained image translation network model", to train and fine-tune the fine-tuned image translation network model once again;

a model output module, configured to: if the first determining result is yes, output the fine-tuned image translation network model as the trained image translation network model; and a directed transfer module, configured to input the high-resolution remote sensing images to be processed in the source domain into the trained image translation network model, to obtain target-domain translated images; and transfer the target-domain translated images in a directed manner;

wherein the image translation network model comprises two generators, two discriminators, and a semantic segmentation model; the two generators are a forward generator and a backward generator; and the two discriminators are a target domain discriminator and a source domain discriminator;

the generator is formed by successively connecting one reflection padding layer, three convolutional layers, five residual blocks, and three convolutional layers; and the discriminator is formed by successively connecting a first convolutional layer module, a second convolutional layer module, and a third convolutional layer module;

wherein the objective loss function establishing module specifically comprises:

an adversarial loss function establishing submodule, configured to establish adversarial loss functions $L_{GAN}(G, D_y, X, Y)$ and $L_{GAN}(F, D_x, X, Y)$ respectively corresponding to forward mapping and backward mapping of the image translation network model:

$$L_{GAN}(G,D_Y,X,Y)=E_{y\sim p_{data}(y)}[\log D_Y(y)]E_{x\sim p_{data}(x)}[\log(1-D_Y(G(x)))]$$

$$L_{GAN}(F,D_X,X,Y)=E_{x\sim p_{data}(x)}[\log D_X(x)]+E_{y\sim p_{data}(y)}[\log(1-D_X(F(y)))]$$

wherein G denotes the forward mapping, F denotes the backward mapping, $D_y$ denotes the target domain discriminator, $D_y$ denotes the source domain discriminator, X denotes the source domain, and Y denotes the target domain; $y\sim p_{data(y)}$ denotes target-domain images conforming to a probability distribution $p_{data(y)}$ of the target domain, $E_{y\sim p_{data}(y)}$ denotes expectations of the target-domain images conforming to the probability distribution $p_{data(y)}$ of the target domain, $x\sim p_{data(x)}$ denotes source-domain images conforming to a probability distribution $p_{data(x)}$ of the source domain, and $E_{x\sim p_{data}(x)}$ denotes expectations of the source-domain images conforming to the probability distribution $p_{data(x)}$ of the source domain; $D_y(y)$ denotes a judgment whether true target-domain data y belongs to the target domain, $D_x(x)$ denotes a judgment whether true source-domain data x belongs to the source domain, and G(x) denotes images which are generated after the source-domain images are subjected to forward mapping with the forward generator and conform to the probability distribution of the target domain; and $D_y(G(x))$ denotes a judgment whether the generated images G(x) corresponding to the source-domain images belong to the target domain, F(y) denotes images which are generated after the target-domain images are subjected to backward mapping with the backward generator and conform to the probability distribution of the source domain, and $D_x(F(y))$ denotes a judgment whether the generated images F(y) corresponding to the target-domain images belong to the source domain.

a cycle consistency loss function establishing submodule, configured to establish a cycle consistency loss function $L_{cyc}(G,F)$ of the image translation network model:

$$L_{cyc}(G,F)=E_{x\sim p_{data}(x)}[\|F(G(x))-x\|_1]+E_{y\sim p_{data}(y)}[\|G(F(y))-y\|_1]$$

wherein F(G(x)) denotes reconstructed images corresponding to the source-domain images and generated after the source-domain images x are subjected to the forward mapping G and the backward mapping F sequentially, and G(F(y)) denotes reconstructed images corresponding to the target-domain images and generated after the target-domain images y are subjected to the backward mapping F and the forward mapping G sequentially;

an adaptive loss function establishing submodule, configured to establish a model adaptive loss function of the image translation network model:

wherein S denotes a label set of the source-domain images, $s_i$ denotes a true label corresponding to the source-domain image in the source-domain image set, Te denotes the source-domain image set, $x_i$ denotes the source-domain image in the source-domain image set, and K denotes the number of the source-domain images in the source-domain image set; $M(\cdot)$ denotes a semantic segmentation model, $IoU(\cdot)$ denotes an Intersection over Union (IoU) calculation function, and $M(G(x_i))$ denotes a predicted label obtained after a generated image $G(x_i)$ corresponding to the source-domain image is predicted by using the semantic segmentation model $M(\cdot)$ ; $M(g(Te))$ denotes a predicted label set for the source-domain image set, that is obtained after generated images corresponding to all the source-domain images in the source-domain image set are predicted by using the semantic segmentation model $M(\cdot)$; and IoU $(s_i, M(G(x_i)))$ denotes an IoU index between a true label and a predicted label that are corresponding to the source-domain image; and an objective loss function establishing submodule, configured to establish the objective loss function $L(G, F, D_X, D_Y, M)$ which combines the image translation loss and the model adaptive loss of the image translation network model:

$$L(G,F,D_X,D_Y,M)=L_{GAN}(G,D_Y,X,Y)+L_{GAN}(F,D_X,X,Y)+\lambda L_{cyc}(G,F)+\varphi L_M(S,M(g(Te)))$$

wherein $\lambda$ denotes a first hyper-parameter and $\varphi$ denotes a second hyper-parameter.

5. The system for directed transfer of cross-domain data based on high-resolution remote sensing images according to claim 4, wherein the training module specifically comprises:

a selection submodule for forming a training data sample subset, configured to acquire a preset number of training data samples from the training data sample set, and group the samples into a training data sample subset;

an objective loss function calculation submodule, configured to input the training data sample in the training data sample subset into the image translation network model, and calculate a numerical value of the objective loss function of the image translation network model;

a submodule for updating parameters of a forward generator and a backward generator, configured to feed back the numerical value of the objective loss function to the forward generator and the backward generator of the image translation network model, to update parameters of the forward generator and the backward generator;

a second determining submodule, configured to determine whether a numerical value of i is less than the preset number, to obtain a second determining result;

a first returning submodule, configured to: if the second determining result is yes, add 1 to the numerical value of i, and return to the step of "inputting the training data sample in the training data sample subset into the image translation network model, and calculating a numerical value of the objective loss function of the image translation network model";

a value initialization submodule, configured to: if the second determining result is no, let the numerical value of i equal 1;

an image reconstruction submodule, configured to input a source-domain image of the training data sample in the training data sample subset into the forward generator of the image translation network model, and carry out forward mapping, to obtain a generated image corresponding to the source-domain image; input the generated image corresponding to the source-domain image into the backward generator of the image translation network model, and carry out backward mapping, to obtain a reconstructed image corresponding to the source-domain image; input a target-domain image of the training data sample in the training data sample subset into the backward generator of the image translation network model, and carry out backward mapping, to obtain a generated image corresponding to the target-domain image; and input the generated image corresponding to the target-domain image into the forward generator of the image translation network model, and carry out forward mapping, to obtain a reconstructed image corresponding to the target-domain image;

a submodule for updating a weight of the source domain discriminator, configured to update a weight of the source domain discriminator according to losses in determining, by the source domain discriminator, whether the generated image corresponding to the target-domain image belongs to the source domain and whether the source-domain image belongs to the source domain;

a submodule for updating a weight of the target domain discriminator, configured to update a weight of the target domain discriminator according to losses in determining, by the target domain discriminator, whether the generated image corresponding to the source-domain image belongs to the target domain and whether the target-domain image belongs to the target domain;

a third determining submodule, configured to determine whether the numerical value of i is less than the preset number, to obtain a third determining result;

a second returning submodule, configured to: if the third determining result is yes, add 1 to the numerical value of i, and return to the step of "inputting a source-domain image of the training data sample in the training data sample subset into the forward generator of the image translation network model, and carrying out forward mapping, to obtain a generated image corresponding to the source-domain image; inputting the generated image corresponding to the source-domain image into the backward generator of the image translation network model, and carrying out backward mapping, to obtain a reconstructed image corresponding to the source-domain image; inputting a target-domain image of the training data sample in the training data sample subset into the backward generator of the image translation network model, and carrying out backward mapping, to obtain a generated image corresponding to the target-domain image; and inputting the generated image corresponding to the target-domain image into the forward generator of the image translation network model, and carrying out forward mapping, to obtain a reconstructed image corresponding to the target-domain image";

a fourth determining submodule, configured to: if the third determining result is no, determine whether the number of iterations reaches a threshold of the number of iterations, to obtain a fourth determining result;

a third returning submodule, configured to: if the fourth determining result is no, add 1 to the number of iterations, and return to the step of "acquiring a preset number of training data samples from the training data sample set, and grouping the samples into a training data sample subset"; and a result output submodule, configured to: if the fourth determining result is yes, output an updated image translation network model as the trained image translation network model.

6. The system for directed transfer of cross-domain data based on high-resolution remote sensing images according to claim 5, wherein the objective loss function calculation submodule specifically comprises:
  an image reconstruction unit, configured to input the source-domain image of the training data sample in the training data sample subset into the forward generator of the image translation network model, and carry out forward mapping, to obtain the generated image corresponding to the source-domain image; input the generated image corresponding to the source-domain image into the backward generator of the image translation network model, and carry out backward mapping, to obtain the reconstructed image corresponding to the source-domain image; input the target-domain image of the training data sample in the training data sample subset into the backward generator of the image translation network model, and carry out backward mapping, to obtain the generated image corresponding to the target-domain image; and input the generated image corresponding to the target-domain image into the forward generator of the image translation network model, and carry out forward mapping, to obtain the reconstructed image corresponding to the target-domain image;
  a unit for calculating the adversarial loss function for the backward mapping, configured to: according to results of determining, by the source domain discriminator, whether the source-domain image belongs to the source domain and whether the generated image for the target domain belongs to the source domain, calculate a value of the adversarial loss function for the backward mapping by using a formula: $L_{GAN}(F,D_X,X,Y)=E_{x \sim p_{data}(x)}[\log D_X(x)]+E_{y \sim p_{data}(y)}[\log(1-D_X(F(y)))]$;
  a unit for calculating the adversarial loss function for the forward mapping, configured to: according to results of determining, by the target domain discriminator, whether the target-domain image belongs to the target domain and whether the generated image for the source domain belongs to the target domain, calculate a value of the adversarial loss function for the forward mapping by using a formula: $L_{GAN}(G,D_Y,X,Y)=E_{y \sim p_{data}(y)}[\log D_Y(y)]+E_{x \sim p_{data}(x)}[\log(1-D_Y(G(x)))]$;
  a unit for calculating the cycle consistency loss function, configured to: according to a difference value between the source-domain image and the reconstructed image corresponding to the source-domain image and a difference value between the target-domain image and the reconstructed image corresponding to the target-domain image, calculate a value of the cycle consistency loss function by using a formula: $L_{cyc}(G,F)=E_{x \sim p_{data}(x)}[\|F(G(x))-x\|_1]+E_{y \sim p_{data}(y)}[\|G(F(y))-y\|_1]$; and
  calculating a value of the model adaptive loss function of the image translation network model by using a formula:

$$L_M(S, M(g(Te))) = \left\| 1 - \frac{\sum_{i=1}^{K} IoU(S_i, M(G(x_i)))}{K} \right\|$$

$$S_i \in S, \ x_i \in Te, \ 0 \le i \le K$$

and
  an objective loss function calculation unit, configured to: according to the value of the adversarial loss function for the backward mapping, the value of the adversarial loss function for the forward mapping, the value of the cycle consistency loss function, and the value of the model adaptive loss function, calculate the numerical value of the objective loss function of the image translation network model by using a formula: $L(G,F,D_X,D_Y,M)=L_{GAN}(G,D_Y,X,Y)+L_{GAN}(F,D_X,X,Y)\pm\lambda L_{cyc}(G,F)+\varphi L_M(S,M(g(Te)))$.

* * * * *